US007379920B2

(12) United States Patent
Leung et al.

(10) Patent No.: US 7,379,920 B2
(45) Date of Patent: May 27, 2008

(54) SYSTEM AND METHOD FOR FACILITATING ELECTRONIC FINANCIAL TRANSACTIONS USING A MOBILE TELECOMMUNICATION DEVICE

(76) Inventors: Gary Leung, Level 37, The Chifley Tower, 2 Chifley Square, Sydney New South Wales 2000 (AU); Rudolph Lee, Level 37, The Chifley Tower, 2 Chifley Square, Sydney New South Wales 2000 (AU); Kevin Cheng, Level 37, The Chifley Tower, 2 Chifley Square, Sydney New South Wales 2000 (AU); Peter Chui, Level 37, The Chifley Tower, 2 Chifley Square, Sydney New South Wales 2000 (AU); Andrew Mitchell, Level 37, The Chifley Tower, 2 Chifley Square, Sydney New South Wales 2000 (AU); Shahen Mekertichian, Level 37, The Chifley Tower, 2 Chifley Square, Sydney New South Wales 2000 (AU); Raymond Fung, Level 37, The Chifley Tower, 2 Chilfey Square, Sydney New South Wales 2000 (AU); Joseph Chan, Level 37, The Chifley Tower, 2 Chifley Square, Sydney New South Wales 2000 (AU)

( * ) Notice: Subject to any disclaimer, the term of this patent is extended or adjusted under 35 U.S.C. 154(b) by 0 days.

(21) Appl. No.: 10/497,739

(22) PCT Filed: Dec. 4, 2002

(86) PCT No.: PCT/AU02/01635

§ 371 (c)(1),
(2), (4) Date: Apr. 14, 2005

(87) PCT Pub. No.: WO03/049364

PCT Pub. Date: Jun. 12, 2003

(65) Prior Publication Data

US 2005/0177517 A1    Aug. 11, 2005

(30) Foreign Application Priority Data

Dec. 4, 2001 (AU) .................................... PR9260

(51) Int. Cl.
G06Q 99/00 (2006.01)
(52) U.S. Cl. .......................................... 705/67; 705/50
(58) Field of Classification Search .................. 705/65, 705/67, 50
See application file for complete search history.

(56) References Cited

U.S. PATENT DOCUMENTS 5,887,266 A    3/1999    Heinonen et al.

(Continued)

FOREIGN PATENT DOCUMENTS

AU    20051840 A1    9/2001

(Continued)

OTHER PUBLICATIONS

International Preliminary Examination Report, dated Jul. 14, 2003.
International Search Report, dated Feb. 4, 2003.

(Continued)

*Primary Examiner*—Pierre Eddy Elisca
(74) *Attorney, Agent, or Firm*—Marshall, Gerstein & Borun LLP

(57) ABSTRACT

A transaction processing system for processing a transaction between a supplier and a customer, said system comprising a supplier device for initiating the transaction, a system server and a mobile communication device, said device containing a message processing program module for enabling local verification of the transaction within the mobile device, wherein a transaction message is sent from the supplier device to the system server, a message requesting payment for the transaction is sent from the system server to the mobile communication device, the transaction is authorized and verified at the mobile telecommunications device from which a verification message is sent back to the system server, and the transaction is then processed.

33 Claims, 16 Drawing Sheets

U.S. PATENT DOCUMENTS

| | | |
|---|---|---|
| 5,999,624 A | 12/1999 | Hopkins |
| 6,067,529 A | 5/2000 | Ray et al. |
| 6,078,806 A | 6/2000 | Heinonen et al. |
| 2001/0037254 A1 | 11/2001 | Glikman |

FOREIGN PATENT DOCUMENTS

| | | |
|---|---|---|
| CA | 2 315 308 | 9/2001 |
| CN | 1296229 * | 5/2001 |
| CN | 1296362 | 5/2001 |
| DE | 2 010 221 | 3/1970 |
| DE | 198 43 439 A1 | 9/1998 |
| DE | 100 03 017 A1 | 1/2000 |
| DE | 100 28 028 A1 | 12/2001 |
| DE | 100 22 632 A1 | 2/2002 |
| EP | 0 986 275 A1 | 7/1999 |
| EP | 1146467 A2 | 8/2002 |
| FR | 2790162 A1 | 8/2000 |
| FR | 2817108 | 11/2000 |
| FR | 2795897 | 1/2001 |
| FR | 2802746 | 6/2001 |
| FR | 2804264 | 7/2001 |
| FR | 2821224 A1 | 8/2002 |
| JP | 08-147373 | 6/1996 |
| JP | 09-097358 | 4/1997 |
| JP | 11-184947 | 7/1999 |
| JP | 11-345264 | 12/1999 |
| JP | 2001-119502 | 4/2001 |
| SE | 9702373-3 | 2/1999 |
| SE | 9703800-4 | 5/1999 |
| WO | WO-97/45814 | 12/1997 |
| WO | WO-98/111519 | 3/1998 |
| WO | WO-98/33343 | 7/1998 |
| WO | WO-98/47116 | 10/1998 |
| WO | WO-99/49606 | 9/1999 |
| WO | WO-99/66436 | 12/1999 |
| WO | WO-99/66705 | 12/1999 |
| WO | WO-00/02168 | 1/2000 |
| WO | WO-00/02374 | 1/2000 |
| WO | WO-00/17833 | 3/2000 |
| WO | WO-00/42581 | 7/2000 |
| WO | WO-00/45350 | 8/2000 |
| WO | WO-00/46768 | 8/2000 |
| WO | WO-00/49585 | 8/2000 |
| WO | WO-00/54457 A1 | 9/2000 |
| WO | WO-00/57369 | 9/2000 |
| WO | WO-00/62516 | 10/2000 |
| WO | WO-01/03078 A1 | 1/2001 |
| WO | WO-01/03083 A1 | 1/2001 |
| WO | WO-01/24122 A1 | 4/2001 |
| WO | WO-01/25979 A2 | 4/2001 |
| WO | WO-01/31594 A1 | 5/2001 |
| WO | WO-01/43092 A1 | 6/2001 |
| WO | WO-01/54079 A2 | 7/2001 |
| WO | WO-01/55979 A1 | 8/2001 |
| WO | WO-01/56313 A1 | 8/2001 |
| WO | WO-01/57747 A1 | 8/2001 |
| WO | WO-02/065414 A1 | 8/2002 |
| WO | WO-02/067534 A1 | 8/2002 |
| WO | WO-02/095700 A1 | 11/2002 |

OTHER PUBLICATIONS

Supplementary European Search Report for EP 02 78 0966 dated Mar. 21, 2007.

* cited by examiner

SYSTEM AND METHOD FOR FACILITATING ELECTRONIC FINANCIAL TRANSACTIONS USING A MOBILE TELECOMMUNICATION DEVICE

TECHNICAL FIELD

The present invention relates to a system and method for facilitating electronic financial transactions. More particularly, one aspect of the invention relates to a system and method for facilitating electronic financial transactions between a goods or services provider and a consumer using a system server in communication with a supplier device, a mobile communication device and a transaction processing server.

The present invention also relates to a system and method for sending service suggestion messages to mobile communication devices. It also relates to a method of confirming the validity of a service suggestion.

BACKGROUND ART

A number of proposals have been made to enable electronic financial transactions to be conducted using mobile phones. Some of these involve the transmission of a customer's mobile telephone number over the internet to a supplier's website. In such a system, the supplier's site transmits the telephone number, a supplier identifier and a relevant product reference to a management server which then contacts the customer by sending an SMS message to the mobile telephone number. The customer then provides his or her consent to the transaction and may provide an identifying authentication. The management server then sends a message to the supplier's site confirming the customer's consent and the supplier may then arrange for delivery of the relevant product (eg, see PCT/FR00/03440). Such a system has a very low level of security and, therefore, users of such a system run a significant risk that messages transmitted over the system (which may include confidential identifying criterion, such as a PUV) may be intercepted and used fraudulently.

Another system which has been developed is one in which the circuitry of the mobile telephone is programmed to incorporate the customer's bank account number and may contain "consistency information" of the customer's bankcard. Accordingly, the system functions by means of the bank account number (or bankcard number) being transmitted by the mobile telephone for the purposes of effecting the financial transactions (eg. see PCT/FR99/01605). A problem with this system is that it also involves a low level of security with the relevant bank account details being transmitted and subject to interception by unauthorised persons.

Another example is the system described in Australian Patent Application Number AU 200051840 entitled "System and process for remote payments and transactions in real time by mobile telephone". This system also provides for the processing of payments and transactions between consumers and service providers, by way of a mobile telephone network. However, this system has a number of disadvantages, namely:

1. The telecommunication and account management functions are performed by the same server. In many countries, government regulations prohibit telecommunication carriers from functioning as financial institutions. In order for this system to work as claimed, it has to perform both telecommunication and banking functions.
2. Having the telecommunication and account management functions performed by the same server compromises the security of the system and renders the accounts of users more vulnerable to being accessed by unauthorised persons than is the case if the telecommunication and account management functions are performed by (more secure) server which is separate from the telecommunication server. This is a concern given that the server contains confidential information of the customer (eg a PIN).
3. The user's PIN (or "secret identification code") is transmitted over the wireless network from the user's mobile phone to the main server. This provides the opportunity for third parties to tap into the wireless transaction and learn the user's PIN. They can then use the PIN to fraudulently conduct further transactions.
4. The system is a simple browser-based system, with the messages to and from the system server being sent over the network as text messages (eg, SMS messages). The procedure for verifying the user's identity is effected by a text message being sent from the system server to the customer's mobile telephone, requesting the customer to enter his or her personal identification code (eg, PIN). The PIN is transmitted over the network and the verification is conducted within the system server. Again, this gives rise to a low level of security with the danger that the PIN could be intercepted by an unauthorised person.
5. The system is very network-dependent and, for it to work effectively, a complex arrangement of data storage means and checks need to be conducted to identify the type of mobile phone of the user and then to determine the relevant network on which the mobile phone operates.
6. The system involves a complicated and expensive arrangement of verification means, databases, account management means, confirmation messages and acceptances messages which interact in a complex manner. This has the effect of slowing down the system and increasing the likelihood of errors or failures occurring.

DEFINITIONS

Throughout this specification (unless the context requires otherwise), the terms:

"electronic financial transaction" and "electronic transaction" are intended to mean "non-cash (or non-cheque)" financial transactions and may include transactions effected by electronic, electromagnetic wireless, radio, telephonic (or other similar) means or by any combination of these;

"comprise", or variations such as "comprises" or "comprising", will be understood to imply the inclusion of a stated element, integer or step, or group of elements, integers or steps, but not the exclusion of any other element, integer or step, or group of elements, integers or steps;

"service provider" is intended to refer to any person or entity which provides goods and/or services; and "service suggestion" is intended to refer to any suggestion, invitation or offer relating to the provision, sale or purchase of any goods or services.

DESCRIPTION OF THE INVENTION

According to a first aspect of this invention, there is provided a transaction processing system for processing a transaction between a supplier and a customer, said system comprising:

(a) a supplier device for initiating a transaction between the supplier and the customer, said supplier device including:
  (i) supplier device data storage means for storing supplier identifying indicia;
  (ii) supplier device data receiving means for receiving transaction data and customer-supplied customer identifying indicia, said transaction data including the monetary amount of the transaction;
  (iii) supplier device message generation means for generating a transaction message containing the supplier identifying indicia, the transaction data and the customer identifying indicia; and
  (iv) supplier device telecommunication means for sending the transaction message to a system server and for receiving messages from the system server;
(b) the system server which includes:
  (i) server data storage means for storing supplier information and customer information;
  (ii) server telecommunication means for sending and receiving messages to and from the supplier device and a mobile communication device of the customer;
  (iii) server verification means:
    for verifying that the supplier identifying indicia and the customer identifying indicia in the transaction message match corresponding indicia within the supplier information and the customer information, respectively; and
    for issuing either a transaction proceed order or a transaction terminate order based on result of said verification;
  (iv) server message generation means for generating either:
    a transaction denied message following receipt of a transaction terminate order; or
    a transaction request message following receipt of a transaction proceed order, said message containing, the supplier identifying indicia, the transaction data, the customer identifying indicia, and a unique transaction identifier which is different for each transaction;
    and for transmitting the transaction denied message or the transaction request message to the server telecommunication means for the sending of said message to the mobile communication device;
(c) the mobile communication device of the customer, comprising:
  (i) mobile device telecommunication means for receiving messages from and sending messages to the system server;
  (ii) a message processing program module comprising:
    mobile device data storage means containing a customer security criterion; and
    transaction authorisation means adapted to extract the transaction data and the supplier identifying indicia contained in the transaction request message, received by the mobile communication device, and to generate and display, on a visual display screen of the mobile communication device, a message containing the transaction data, the supplier identifying indicia and a request for the customer either to:
      authorise the transaction, by making a first pre-determined entry in a keypad of the mobile device, said predetermined entry including a secret identification parameter of the customer, or
      decline the transaction, by making a second pre-determined entry in the keypad;
    (iii) verification message generation means adapted to:
      receive an authorisation order generated by the first pre-determined entry into the keypad;
      following receipt of said authorisation order, verify that the identification parameter matches the customer security criterion in the mobile device data storage means and, if they do match, generate a verification message, said verification message containing contents of the transaction request message; and
      encrypt the verification message to generate a secure verification message.
    (iv) decline transaction message generation means adapted to:
      receive a decline order generated by the second pre-determined entry into the keypad; and
      generate a decline transaction message, following receipt of said decline order; and
    (v) message transfer means for transferring the secure verification message, or the decline transaction message, to the mobile device telecommunication means for sending to the system server;
(d) a transaction processing server, in secure communication with the system server, comprising:
  (i) means for receiving the secure verification message;
  (ii) means for decrypting the secure verification message; and
  (iii) processing means for: identifying a customer account associated with the customer identifying indicia; identifying a supplier account associated with the supplier identifying indicia; arranging for said customer account to be debited by the monetary amount of the transaction; and arranging for said supplier account to be credited by said monetary amount.

A particularly advantageous feature of the above system is the message processing program module. This module enables the transaction to be verified locally by the customer on his or her mobile communication device (eg a mobile phone). In this way, the secret identification parameter (eg a personal identification number (PIN)) is not transmitted to the server. Accordingly, there is no possibility of the PIN being intercepted in transit. Similarly, the server does not contain any reference to the secret identification parameter and there is therefore no prospect of the parameter being accessed or viewed on the server by an unauthorised person. The security of the above system is further enhanced by the encryption of the transaction verification message and by the digital signature which may optionally be attached to the message.

The customer identifying indicia is a typically a mobile telephone number of said mobile communication device. However, alternatively, it can be some other number or code which is recognisable by the system server as being the identifying number or code of the customer. When a number or code is used, which is different from the mobile telephone number, the system server will need to locate the mobile telephone from its data storage means (by reference to the provided number or code). The unique transaction identifier of the transaction request message is typically assigned by the system server.

The transaction data further may further include, in addition to the monetary amount of the transaction, one or more of the following: time of the transaction; nature of the goods and/or services being purchased; monetary amount of particular goods and/or services of the transaction; and any discount or surcharge applied by the supplier.

The customer security criterion is typically a personal identification number (PIN) of the customer.

The transaction message, the transaction request message and the verification message are preferably formed as mobile data messages, which, for example, may be selected from SMS messages, GPRS messages and UTMS messages.

The secure verification message, sent from the mobile communication device to the system server, should be a non-text message and will preferably comprise a binary data stream. The transaction message and the transaction request message may also comprise binary data streams. This provides even further security to the system as, even if they are intercepted, they would not be able to be comprehended.

It is particularly preferred that the system server also includes digital signature recognition means; and that the verification message generation means is further adapted to create and attach to the secure verification message a digital signature which is adapted to be recognised by the recognition means. This adds a substantial further level of security to the transaction verification message.

The transaction authorising means of the program module may be further adapted to include, in the request within the message generated by said authorising means, a further option to enable the customer to indicate that the monetary amount of the transaction is to be varied. This enables the customer to provide a tip or gratuity, for instance at a restaurant or café. This option is typically exercisable by a third predetermined entry being made in the keypad. In this situation, the transaction authorising means will typically be adapted, upon receipt of the third predetermined entry being made, to:

(a) generate a query message querying the amended monetary amount to which the customer wants the monetary amount amended;
(b) receive said amended monetary amount input by the customer; and
(c) amend the monetary amount of the transaction data to the amended monetary amount.

As will be apparent, if the monetary amount is so amended then, in all subsequent messages which contain the monetary amount, the amended monetary amount should be substituted for the monetary amount.

In one preferred embodiment, the message processing program module is contained in a SIM card. Although this is convenient and advantageous, it is not essential as other means for incorporating the program module into a mobile communication device can readily be contemplated.

In this system, it is generally desirable that each message have attached thereto a transaction code representative of the relevant message. This enables the device which receives the message readily to recognise whether it is a message which it should be receiving for the purpose of processing a financial transaction under this system.

Therefore, it is desirable that:

(a) the transaction message sent to the system server includes a predetermined transaction message code (eg 001);
(b) the transaction request message sent to the mobile communication device contains a predetermined request message code (eg 002);
(c) the verification message sent to the system server contains a predetermined verification message code (eg 003);

wherein said codes are recognisable by the receiving system server or device and said receiving system server or device are adapted to discontinue the transaction if the relevant message does not contain its predetermined code.

In a preferred embodiment of this invention, the server data storage means of the system server further includes benefits information concerning the availability of benefits offered by system-subscribed suppliers, and the system server further includes:

(a) checking means adapted to determine whether the server data storage means contains any benefits information concerning any benefits which are, or may be, available in respect of, or in association with, the transaction;
(b) means for generating a benefit notification message if any relevant benefit is located and for transmitting this notification message to the server telecommunication means for sending to the supplier device, said notification message containing details of the located benefit and a request for the supplier to verify or deny availability of the benefit.

In this embodiment of the invention, the supplier device would typically further include benefit processing means adapted to:

(a) receive and display the benefit notification message;
(b) receive a verification input or a denial input from the supplier; and
(c) upon receipt of a verification input, revise the monetary amount to a revised monetary amount to accommodate any discount associated with said benefit and to send to the system server a benefit confirmation message containing the revised monetary amount; or
(d) upon receipt of a denial input, send a benefit denial message to the system server.

As would be apparent, if the monetary amount is so revised, as contemplated above, in all subsequent messages which contain the monetary amount, the revised monetary amount will be substituted for the monetary amount.

The above benefits may be discounts (including discount coupons), special deals (eg "2 for 1" deals), special offerings of products and services or other similar offers.

In a further preferred embodiment, the server data storage means further includes a transaction database adapted to capture desired details of each transaction. These desired transaction details include one or more of the following:

(a) the transaction data;
(b) desired additional transaction data including some or all of, date of transaction, amount of any discount provided; and the goods or serves covered by the transaction; and
(c) customer identifying indicia, and supplier identifying indicia.

The transaction processing server should be in secure communication with a financial institution server, said financial institution server adapted to transfer funds, corresponding to the monetary amount, to the supplier account and to record a corresponding debit in the customer account. Typically, the transaction processing server communicates with the financial institution server via a payment gateway.

The transaction processing server may further include account record means for keeping a record of the supplier account, the customer account and all debits and credits associated with these accounts.

In the present system, it is further preferred that:

(a) the transaction processing server is adapted to send, upon completion of the transaction, a transaction complete message to the system server; and (b) the system server is adapted to send said transaction complete message to either or both of the supplier device and the mobile communication device.

A beneficial feature of the above system is the relative simplicity of the system server and the message flow to and from this server.

According to a second aspect of this invention, there is provided a message processing program module, for use in a mobile communication device, which device forms part of the transaction processing system described above, said program module comprising:

(a) mobile device data storage means containing a customer security criterion;
(b) message receiving means for receiving the transaction request message from the system server;
(c) transaction authorisation means adapted to:
  (i) extract transaction data and the supplier identifying indicia contained in the transaction request message;
  (ii) generate and display, on a visual display screen of the mobile communication device, a text message containing the transaction data, the supplier identifying indicia and a request for the customer either to:
    authorise the transaction, by making a first pre-determined entry in a keypad of the mobile device, said predetermined entry including a secret identification parameter of the customer, or
    decline the transaction, by making a second pre-determined entry in the keypad;
(d) verification message generation means adapted to:
  (i) receive an authorisation order generated by the first pre-determined entry into the keypad;
  (ii) following receipt of said authorisation order, verify that the identification parameter matches the customer security criterion in the mobile device data storage means and, if they do match, generate a verification message, said verification message containing contents of the transaction request message; and
  (iii) encrypt the verification message to generate a secure verification message.
(e) decline message generation means adapted to:
  (i) receive a decline order generated by the second pre-determined entry into the keypad; and
  (ii) generate and send a decline transaction message, following receipt of said decline order; and
(f) message transfer means for transferring the secure verification message or the decline message to the mobile device telecommunication means for sending to the system server.

As noted above, this program module is a unique feature which substantially improves the security of the abovementioned system. Incorporated in the program module is means for enabling self-verification by a user completely at the user's mobile device, without any message (containing the secret identification parameter) having to be sent from the mobile device to the system server. The program module also provides for the verification message to be encrypted and (optionally) digitally signed which substantially improves the security of the system.

As is also noted above, the customer security criterion is preferably a personal identification number (PIN) of the customer.

The security of the system is further enhanced by forming the secure verification message, sent from the mobile communication device to the system server, of a binary data stream.

As noted above, the message processing program module is preferably (but not necessarily) contained in a SIM card.

In a third aspect of this invention, there is provided a method of processing a transaction between a supplier and a customer, using a transaction processing system according to any one of claims x to y, said method comprising the following steps:

(a) within the supplier device:
  (i) receiving transaction data and customer-supplied customer identifying indicia;
  (ii) generating a transaction message containing the supplier identifying indicia (obtained from data storage means within the supplier device), the transaction data and the customer identifying indicia;
  (iii) transmitting the transaction message to the supplier device telecommunications means; and
  (iv) sending the transaction message to the system server;
(b) within the system server:
  (i) receiving the transaction message;
  (ii) verifying that the supplier identifying indicia and the customer identifying indicia in the transaction message match corresponding indicia within the supplier information and customer information (stored in data storage means within the server);
  (iii) issuing either a transaction proceed order or a transaction terminate order based on result of said verification;
  (iv) transmitting the transaction proceed order or the transaction terminate order to the server message generation means;
  (v) generating, within the server message generation means, either:
    a transaction denied message following receipt of a transaction terminate order; or
    a transaction request message following receipt of a transaction proceed order, said message containing, the supplier identifying indicia, the transaction data, the customer identifying indicia, and a unique transaction identifier which is different for each transaction;
  (vi) transmitting the transaction denied message or the transaction request message to the server telecommunications means;
  (vii) sending the transaction denied message to the supplier device or sending the transaction request message to mobile device telecommunication means of the customer;
(c) within the mobile communication device:
  (i) receiving, within the telecommunication means of the mobile device, the transaction request message;
  (ii) transmitting the transaction request message to receiving means within a message processing program module;
  (iii) said module:
    extracting transaction data and supplier data from the transaction request message;
    generating and displaying, on a visual display screen of the mobile communication device, a message containing the transaction data, the supplier identifying indicia and a request for the customer either to:
      authorise the transaction, by making a first pre-determined entry in a keypad of the mobile device, said predetermined entry including a secret identification parameter of the customer, or decline the transaction, by making a second-predetermined entry in the keypad;

receiving an authorisation order generated by the first pre-determined entry into the keypad;

following receipt of said authorisation order, verifying that the identification parameter matches the customer security criterion in the mobile device data storage means and, if they do match, generating a verification message, said verification message containing the contents of the transaction request message;

encrypting the verification message to generate a secure verification message;

transferring the secure verification message to the mobile device telecommunication means;

(iv) sending the secure verification message to the system server.

The above method will typically involve further standard steps, including forwarding the secure verification message onto the transaction processing server. At the transaction processing server, the secure message verification is decrypted. This decryption enables the transaction processing server to identify a customer account associated with the customer identifying indicia and to identify a supplier account associated with the supplier identifying indicia. Typically, the transaction processing server then arranges for said customer account to be debited by the monetary amount of the transaction and for said supplier account to be credited by said monetary amount.

The abovementioned unique transaction identifier of the transaction request message is typically assigned by the system server. It is particularly preferred that the transaction message, the transaction request message and the verification message are mobile data messages, which may be selected from SMS messages, GPRS messages and UTMS messages.

In order to enhance the security of the above system and method, a self-designed test digital certificate may be issued on each of the system components. These certificates are then used to sign all messages communicating between the system components.

For example, each outgoing transmission may consist of a digital signature, the public key of the centre's digital certificate and an octal representation of the XML content. The digital signature is created with the private key of the sender. The receiver will be able to use the public key to verify the signature.

The test certificates are typically installed in the personal certificate store locally in each component. If one of the components runs multiple system components, then that component may contain multiple certificates.

In a further aspect of this invention, there is provided a transaction processing system, including:

(a) a supplier device for initiating a transaction between a customer and a service provider;

(b) a transaction processing server adapted to process said transaction; and (c) a system server adapted to receive messages from, and forward messages to, the supplier device, the transaction processing server and a mobile communication device;

wherein:

(i) the supplier device is adapted so that, when initiating a transaction, it forwards a transaction initiation message to the system server; and (ii) the system server is adapted so that:

after receiving said transaction initiation message, it sends a first transaction authorisation request to the mobile communication device, it may receive a secured first transaction verification message from the mobile communication device in response to said authorisation request;

upon receipt of said secured first transaction verification message, it sends a second transaction authorisation request to the transaction processing server;

it receives a second transaction verification message from the transaction processing server; and provided the second transaction verification message satisfies predetermined criteria, it sends a first transaction approval message to said supplier device.

Preferably, the system server is further adapted to send a second transaction approval message to said mobile communication device if the second transaction verification message satisfies predetermined criteria.

In a still further aspect, the present invention provides a system server for facilitating an electronic financial transaction, said system server being adapted to communicate with a supplier device, a mobile communication device of a customer and a transaction processing server, wherein said system server is further adapted to:

(a) receive a transaction initiation message from a supplier device, said message containing certain customer identifying indicia;

(b) identify the customer by reference to customer identifying indicia;

(c) send a first transaction authorisation request to the mobile communication device of the identified customer in response to receiving the transaction initiation message;

(d) receive a secured first transaction verification message from the mobile communication device;

(e) send a second transaction authorisation request to the transaction processing server;

(f) receive a second transaction verification message from the transaction processing server; and (g) send a first transaction approval message to said supplier device if the second transaction verification message satisfies predetermined approval criteria.

Preferably, the system server is further adapted to send a second transaction approval message to said mobile communication device if the second transaction verification message satisfies predetermined approval criteria.

In yet another aspect, the present invention provides a method of facilitating an electronic financial transaction using a system server, which is adapted to communicate with a supplier device, a mobile communication device and a transaction processing server, wherein the system server performs the steps of:

(a) receiving a transaction initiation message from the supplier device;

(b) sending a first transaction authorisation request to the mobile communication device in response to receiving the transaction initiation message;

(c) receiving a secured first transaction verification message from the mobile communication device;

(d) sending a second transaction authorisation request to the transaction processing server;

(e) receiving a second transaction verification message from the transaction processing server; and (f) sending a first transaction approval message to said supplier device if the second transaction verification message satisfies predetermined approval criteria.

Preferably, the method further includes the step of sending a second transaction approval message to said mobile communication device if the second transaction verification message satisfies predetermined criteria.

Preferably, the supplier device has a display screen and the step of displaying the transaction acceptance and rejection messages includes displaying those messages on the display screen.

Alternatively, the supplier device may be in communication with a printer and the step of displaying the transaction acceptance and rejection messages includes displaying those messages by sending to the printer a print command which corresponds to the messages.

Preferably, the mobile communication device is further adapted to receive a transaction approval message from the system server, and to display the transaction approval message on the display screen.

Preferably, the mobile communication device is programmed to require entry of a user's personal identification details (such as a PIN number or password and a security key) before the secured transaction verification message is sent to the system server.

Preferably, the first transaction verification message will be digitally secured using some customer identification data (such as a personal identification (PIN), secret number, password or the like and a security key). The first transaction verification message preferably includes a customer verification that the customer authorises the transaction to proceed.

The transaction approval message may simply be a positive indication from the transaction processing server that the transaction may proceed.

Preferably, the mobile communication device is a mobile phone or cellular phone.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

BRIEF DESCRIPTION OF THE DRAWINGS

Preferred embodiments of the aspects of this invention will now be described, by way of example only, with reference to the accompanying drawings in which.

DETAILED DESCRIPTION OF PREFERRED EMBODIMENTS

In a preferred embodiment, the present invention provides a system and process for facilitating electronic financial transactions between a goods and services provider and a consumer using a system server in communication with a supplier device, a mobile communication device, a system service and transaction processing server. The invention includes a system and method for conducting credit/debit payment services between a goods/services provider ("supplier") and a consumer ("customer") using wireless communication devices.

Figure 1:
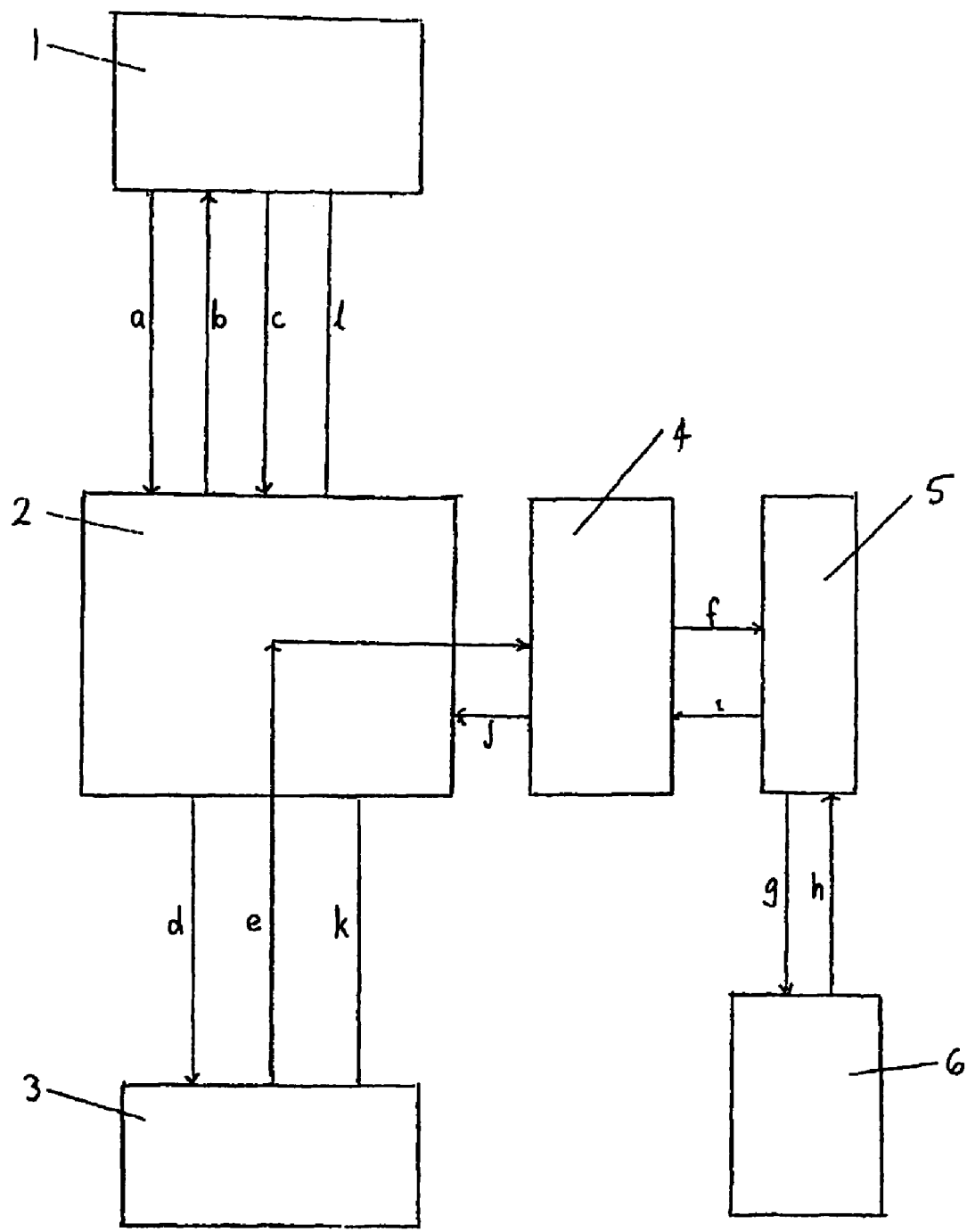
FIG. 1 is a schematic flow diagram illustrating an embodiment of the system and the method of this invention.

One version of the system and process is illustrated in the flow diagram of FIG. 1 which shows the steps involved in processing (or facilitating) a transaction according to the invention. The present invention allows a customer of goods and services to initiate a credit/debit payment by providing the supplier of goods and services with a pre-defined client identifier, such as a mobile telephone number, which is provided by a third party system operator.

Figure 2:
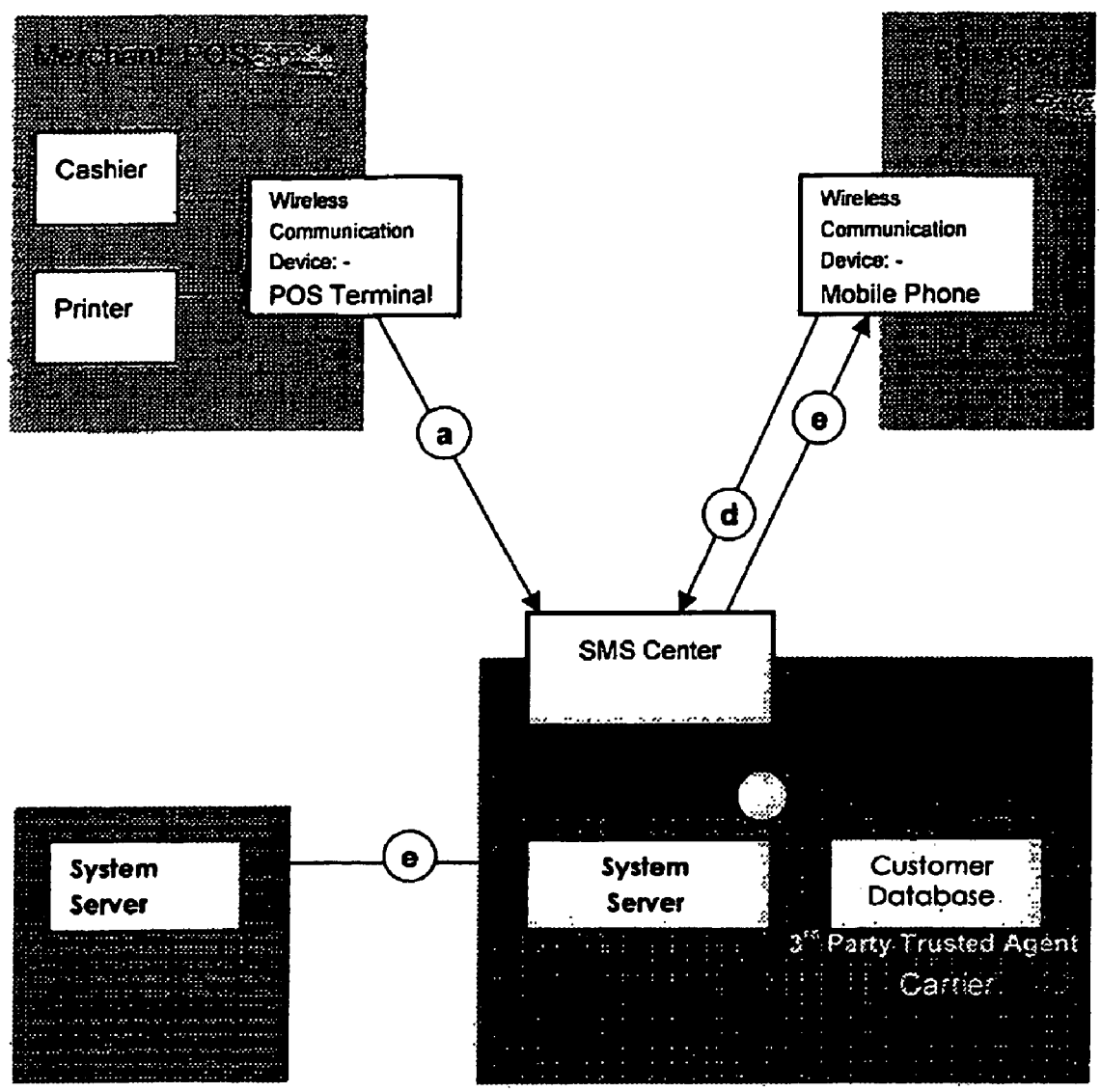
FIG. 2 is a simplified flow diagram illustrating the processing of a transaction according to the invention.

As can be seen from FIGS. 1 and 2, an embodiment of the system of this invention includes a supplier device 1 (eg a supplier terminal); a system server 2, a mobile communication device 3 of a customer, and a transaction processing server 4. The supplier device 1, the system server 2, the mobile communication device 3 and the transaction processing server 4 are adapted to communicate by means of messages. The system server 2 and the transaction process server 4 are in wired (and secured) communication. However, the system server 2, the mobile communication device 3, and the supplier device 1 are only in wireless communication with each other and, accordingly, they communicate by means of mobile data messages.

In the process of this invention, once a transaction is initiated between a customer and a supplier, the customer provides to the supplier customer identifying indicia (typically the mobile telephone number of the mobile communication device 3 (which is typically a mobile telephone). For the system to operate, the customer and the supplier must be subscribers to the system and their respective identifying indicia must be recorded in the system server 2.

Figure 3:
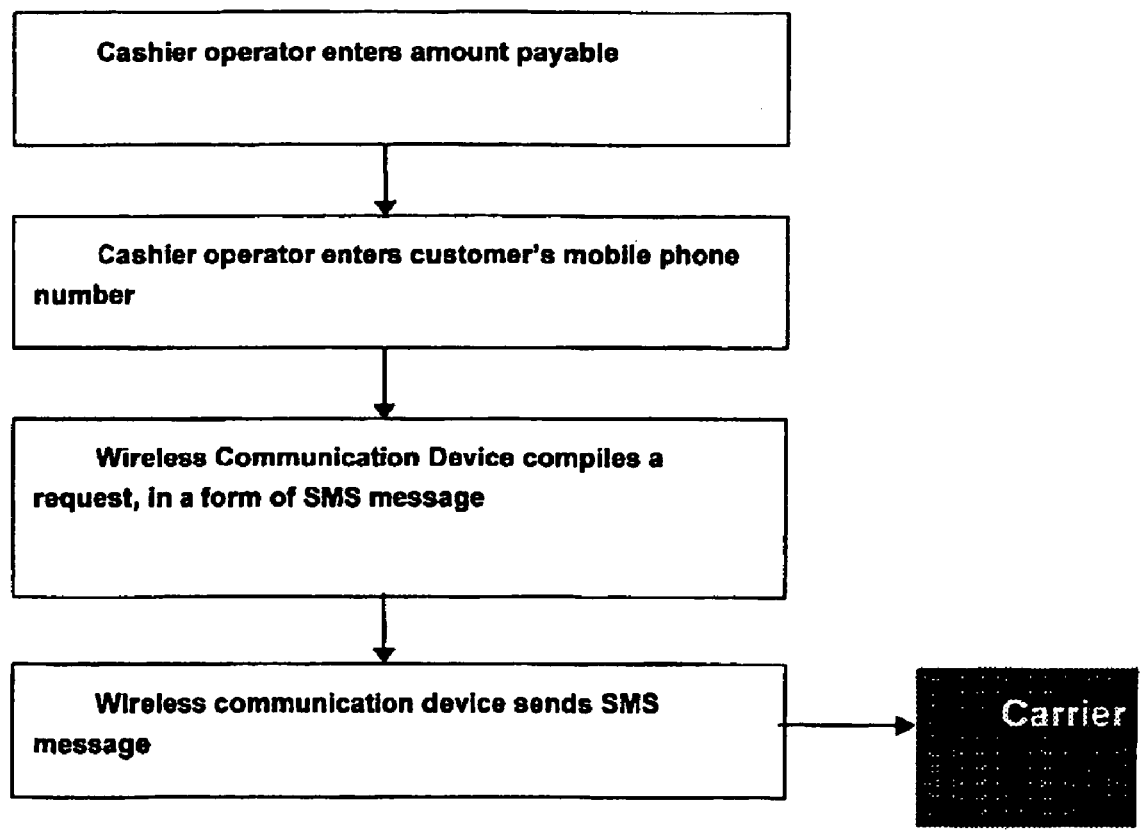
FIG. 3 is a simplified flow diagram illustrating initial steps in the method of the invention which occur at a supplier device (eg supplier point of sale)

As depicted in FIG. 1 and FIG. 3, in order to process the transaction, a transaction message (a) is sent from the supplier device 1 (controlled by the supplier), to the system server 2. The transaction message (a) includes the customer identifying indicia and supplier identifying indicia. The supplier identifying indicia is typically embedded in data storage means of the supplier device 1 (or it could be entered manually).

Figure 4:
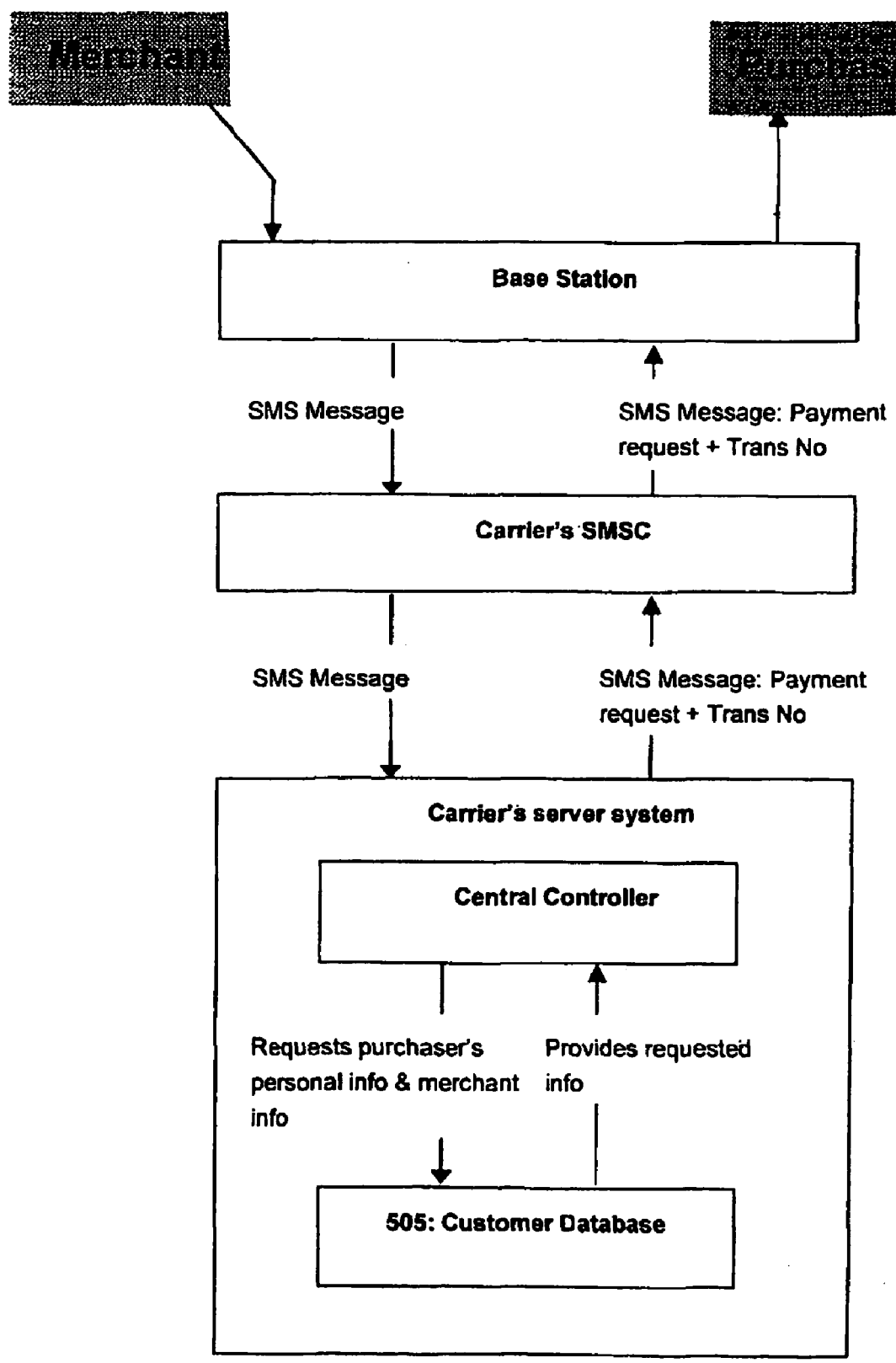
FIG. 4 is a simplified flow diagram illustrating other steps in the method of the invention which occur at the system server.

As shown in FIG. 4, upon receipt of the transaction message (a) the systems server conducts a preliminary verification to verify that the customer identifying indicia and the supplier identifying indicia are recorded in data storage means within the system server 2. If either of these indicia are not recognised by the system server 2, the transaction will not proceed further and a corresponding message may be sent back to the supplier device 1.

The transaction message (a) may further include a transaction message code identifiable by the system server 2 so that if a purported transaction message is received by the system server 2 without a transaction message code, the system server 2 will not recognise the message as having been sent by a subscriber to the system. In such a situation, the transaction will not proceed.

Following verification of the customer identifying indicia and the supplier identifying indicia of the transaction message, the system server 2 may conduct a review of its database(s) to determine if there is a record of an applicable coupon (eg a discount or promotional coupon) being redeemable with the supplier in respect of the transaction. As shown in FIG. 1, if such a coupon is located, the system server 2 is adapted to generate and send a coupon notification message (b) to the supplier device 1. The supplier device 1 is programmed then to prompt the supplier to confirm or deny the availability of the coupon and, if available, to send a coupon confirmation message (c) back to the system server 2. The coupon notification and confirmation procedure is entirely optional and will not apply in respect of all transactions or all suppliers linked to the system.

Following verification of the customer identifying indicia and the supplier identifying indicia in the transaction message (and, where applicable, following receipt of the coupon confirmation message), the system server 2 is adapted to generate and send a transaction request message (d) to the mobile communication device 3. The transaction request message (d) typically contains a unique transaction identifying code (applied by the system server 2), the customer identifying indicia, the supplier identifying indicia and transaction data. At the least, the transaction data includes the amount payable under the transaction. Where a coupon has been confirmed as being available in respect of the transaction, the transaction data will include the amount payable as altered (eg reduced) by virtue of the coupon.

The mobile communication device 3 receives the transaction request message and undertakes a self-verification process described further below.

Following verification that the customer wishes to proceed with the transaction, the mobile communication device 3 generates a verification message. This verification message contains contents of the transaction request message (d) but is encrypted to generate a secure verification message (e) which is sent to the systems server 2. This secure verification message (e) may further include a digital signature, forming part of the message, for added security.

The secure verification message (e) may also include a verification message code identifiable by the system server so that, if a purported verification message is received by the system server 2 without the verification message code, the transaction will not proceed further.

Upon receipt of the secure verification message (d), the system server 2 transmits it to the transaction processing server 4. The system server 2 is in wired communication with the transaction processing server 4. The transaction processing server 4 is a secure server which contains decrypting means adapted to decrypt the secure verification message (e). The server 4 is also adapted to identify (from the customer identifying indicia and the supplier identifying indicia) the relevant accounts of the customer and the supplier and to arrange for processing of the financial transaction. This processing is typically effected in conjunction with a financial institution 6 which is in communication with the transaction processing means via a payment gateway 5.

In one embodiment of this invention, a system is developed to enable:

- a third party system operator(s) ("Trusted Agent") to provide Personal Identification Number ("PIN"), Client Identifier ("Client Identifier"), and Subscriber Identity Module card Trusted Key ("Trusted Key") to a customer
- the Customer to initiate a credit/debit payment by providing the Client Identifier
- the Supplier to use the client identifier and the total invoiced amount to request the Trusted Agent to activate a payment request to the Customer's wireless communication device
- the Trusted Agent to use the Client Identifier to retrieve personal information of the Customer from the Trusted Agent's server system
- the Trusted Agent to use the personal information retrieved, the information of the Supplier, and a unique transaction number generated by the Trusted Agent server system ("Transaction Number"), to compile a payment request and such request is send to the Customer's wireless communication device through a licensed spectrum or the Trusted Agent to send the personal information retrieved, the information of the Supplier ("Supplier Identity"), and a unique transaction number generated by the Trusted Agent server system to the Customer's wireless communication device through a licensed spectrum
- the Customer's wireless communication device to display the payment request or the Customer's wireless communication device to use the Supplier Identity, Transaction Number, and the Personal Information to compile a payment request and display the payment request
- the Customer to authorise a credit/debit payment in response to the payment request by inputting the PIN via an input interface of the Customer's mobile handset
- the Customer to authenticate his/her identity in response to the payment request by inputting the PIN via the input interface of the Customer's mobile handset
- the system in the Customer's mobile handset to compile a secured data packet (or transaction verification message) based on information such as the PIN and the Customer's Trusted Key. The secured data packet maybe or may not be digitally signed
- the Customer's mobile handset to send the secured data packet back to the Trusted Agent via the wireless telecommunication network operating through a licensed spectrum, and the secured data packet to be used by the Trusted Agent (or system server) such that the Customer's identity is authenticated and a credit/debit payment is authorised, which will result in the Customer paying the Supplier.

The method of the present invention involves four main steps, described below with reference to FIGS. 3 to 6.

Step 1

FIG. 3 is a flow diagram illustrating the first main step in the method of the present invention which occurs at a point of sale.

In this embodiment, the Supplier installs the Supplier Device (or supplier device) at its point of sales. The Supplier Device communicates with the Carrier's GSM network and it enables the Supplier to use the invention. In this embodiment, the Supplier has a transaction account/supplier service agreement with a bank, the Customer is enabled with the invention, and the Customer carries his/her wireless communication device, in this embodiment, mobile handset, when he/she visits the Supplier ("Mobile Handset").

A number of steps occur at the point of sale:
1. Assume a Customer decides to buy an item at a shop, ie Supplier, using the Invention. The Customer is now at the counter waiting to pay for the item. The cashier operator examine the item and present an invoice to the Customer
2. In this embodiment, the Supplier partners with the Bank and the Carrier to exploit the Invention. The Supplier therefore offers payment options such as Cash, Cheque, Debit Card, VISA, Master, AMEX, Diners Club, JCB and others, as well as the Invention. In alerting the Customer that the Invention is available as one of the payment options, the Invention is added to the list of payment modes that are accepted by the Supplier. This can be in a form of logo/sticker placed around the cash register
3. In this embodiment, the Customer chooses to settle the invoice using the Invention
4. Through choosing to use the Invention, the cashier operator asks for the Customer's Client Identifier, in this embodiment, his/her mobile handset number
5. As shown in FIG. 3, the cashier operator types in the Client Identifier and the amount payable by the Customer ("Amount Payable") into a communication device. In this embodiment, a GSM device is provided to the Supplier ("Supplier GSM Device") by the Carrier that is capable of sending text messages via the Short Messaging System ("SMS"). The Supplier GSM Device is logged onto the Carrier's wireless telecommunication network through a licensed spectrum, ie 900 MHz
6. The Supplier GSM Device sends the Customer's mobile handset number and the Amount Payable as a request to the Carrier in a form of SMS message using SMS. The SMS message is used to activate a payment request to the Customer's wireless communication device, which, in this embodiment, his/her mobile handset The request is transmitted from the Supplier GSM Device to a base station within the GSM telecommunication network of the Carrier using the 900 MHz-licensed spectrum.

Step 2

FIG. 4 is a flow diagram illustrating the second main step in the method of the present invention which occurs at a telecommunication carrier (or system server).

In this embodiment, the Carrier's Short Messaging System Center ("SMSC") is networked with its server system ("Server System").

Figure 7:
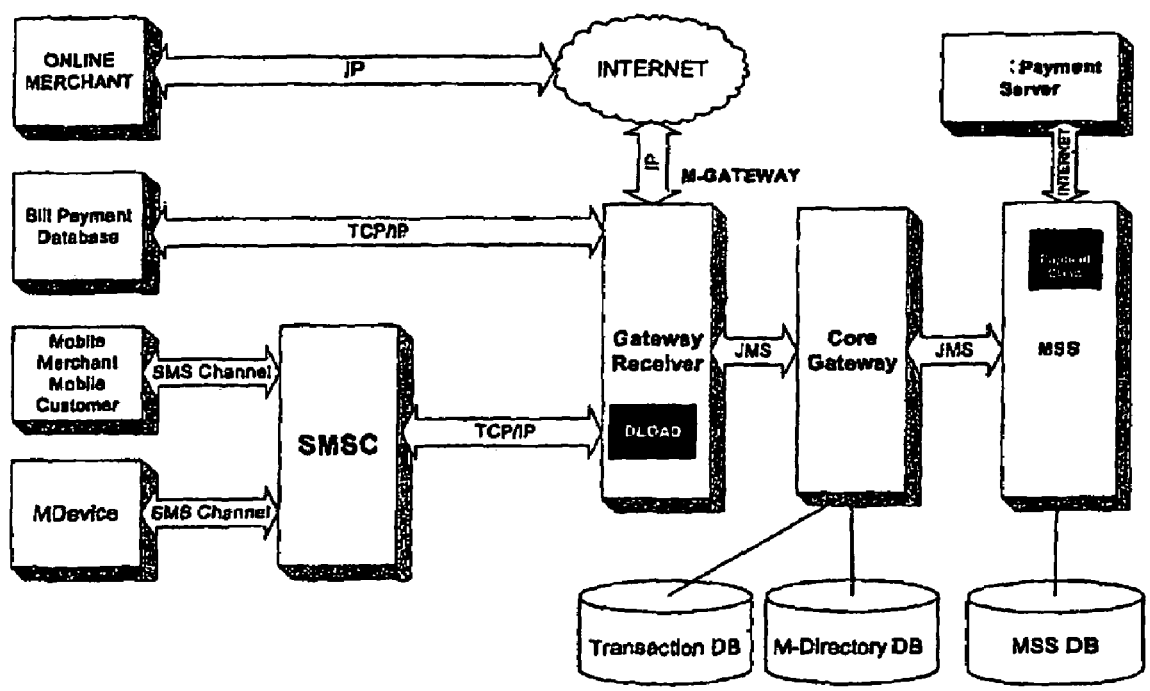
FIG. 7 is a schematic diagram of an embodiment of the system of present invention showing further detail of the components of the system server.
Figure 8:
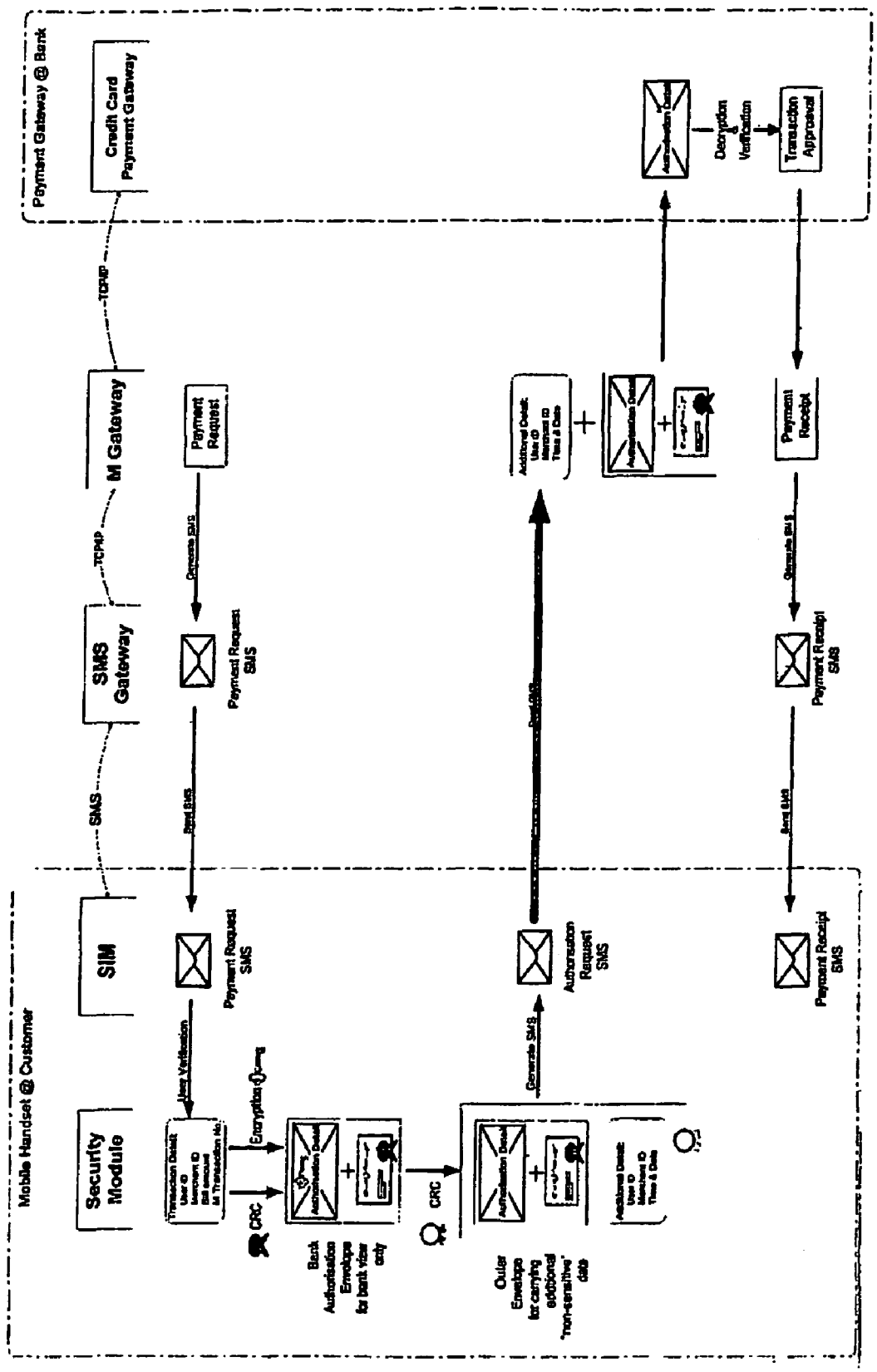
FIG. 8 is a transactional flow diagram illustrating an embodiment of the system and method of this invention.

In one embodiment (and as shown in FIG. 7), the system server includes two databases:—

A) Customer Database (or "M-Directory DB" as labelled in FIG. 7)—This database contains relevant information about the Customers and the suppliers.
The preferred fields are:—
Internal customer reference number (for both customers and suppliers)
Customers' and Suppliers' name
ICCID, i.e. Customer ID or Supplier ID
Mobile handset number B) Transactional Database—This database keeps an audit trail of all transactions. The database records the messages related to the transactions.

Figure 5:
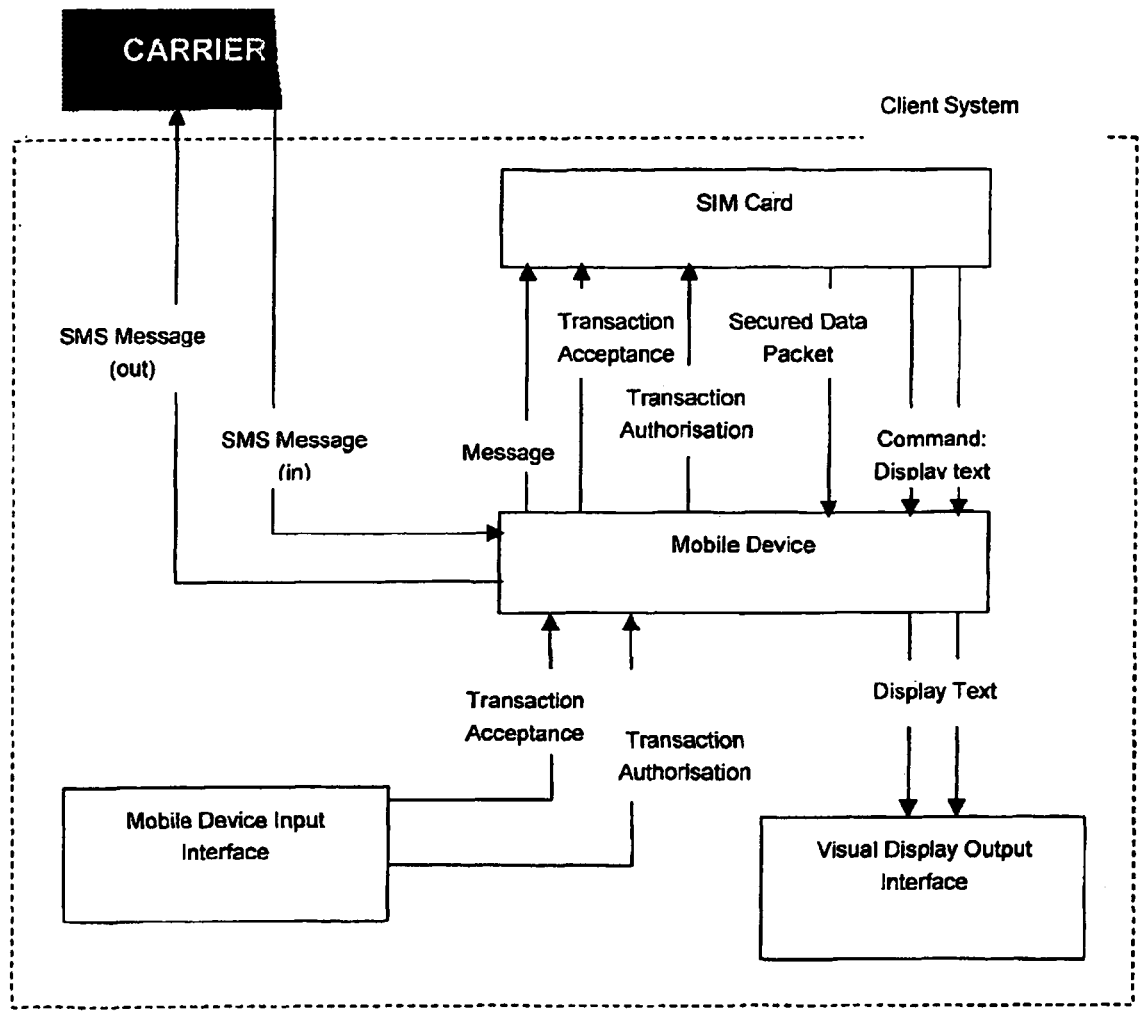
FIG. 5 is a simplified flow diagram illustrating later steps in the method of the present invention which occur at a customer's mobile device (or mobile communication device)

FIG. 5 illustrates a number of further sub-steps:
1. The Carrier's SMSC receives a SMS message from the Supplier GSM Device, directing to a special number linking to the Server System
2. The Carrier's SMSC routes the SMS message to the Server System
3. The Server System receives the SMS message from the SMSC, with an indicator, (such as Device Number), noting that the message is sent from the Supplier GSM Device
4. The Server System reads the information contained in the SMS message, ie. the amount payable and the mobile handset number and stores it in its RAM
5. In this embodiment, the Server System uses the mobile handset number to match the data-field within its database, and retrieve information that is linked to the mobile handset number. In this embodiment, the information retrieved includes a record of the Customer, ie first name of the Customer, Mobile Handset Number of the Customer
6. The Server System also uses the Device Number to match the data-field within its database, and retrieve Supplier information that is linked to the Device Number. In this embodiment, the Supplier information retrieved includes name of the Supplier, Supplier id.
7. In this embodiment, the Server System assigns a unique transaction number ("Transaction Number") using the Supplier information, the Customer's information, the time and the Amount Payable.
8. The Server System generates a payment request in a form of a SMS message ("Payment Request"). This message contains data-fields including first name of the Customer, name of Supplier, Supplier id, Transaction Number and Amount Payable.
9. The Server System sends the Payment Request to the Mobile Handset via the SMSC of the Carrier's GSM telecommunication network using the 900 MHz-licensed spectrum.

Step 3

FIG. 5 is a flow diagram illustrating the third main step in the method of the present invention which occurs at a user's mobile device (or mobile communication device).
1. Upon receiving the Payment Request, the Mobile Handset passes the SMS message to the Client System, which reads the Payment Request. The Client System then command the Mobile Handset to display a text message on the output interface of the Mobile Handset
2. In this embodiment, a text message is displayed on the screen of the Mobile Handset immediately and automatically. The message contains the Customer's first name, the Supplier name, the Amount Payable, and a request to authorise a payment. The Customer checks the text message and examines the details of the Payment Request, ie Supplier name and the Amount Payable. The Customer can choose to either terminate the transaction, ie Amount Payable incorrect, or proceed with the transaction. In this embodiment, the Customer decides to proceed with the request and the Customer needs to press the "OK" button (or similar activating button, icon or the like) located in the input interface.

3. In this embodiment, the Client System receives the command from the Customer to proceed with the request. The Client System generates a text message to the mobile handset's screen, prompting the Customer to enter his/her PIN. The text message repeats the Amount Payable, and provides a notice to the Customer that he/she is authorising the payment by entering the PIN.

4. The Customer enters the PIN and presses (in this embodiment) the "OK" button located in the input interface. This action binds the customer to pay the Bank the Amount Payable, which the Bank in turn settles the invoice with the Supplier on behalf of the Customer. In this embodiment, the Client system creates a secured data packet from the Transaction Number, Amount Payable and the Supplier id. The secured data packet is digitally signed by a digital signature created from the PIN and the Trusted Key.

5. In this embodiment, the Client System commands the Mobile Handset to send the secured data packet back to the Server System via the Carrier's wireless telecommunication network operating through a licensed spectrum.

Step 4

Figure 6:
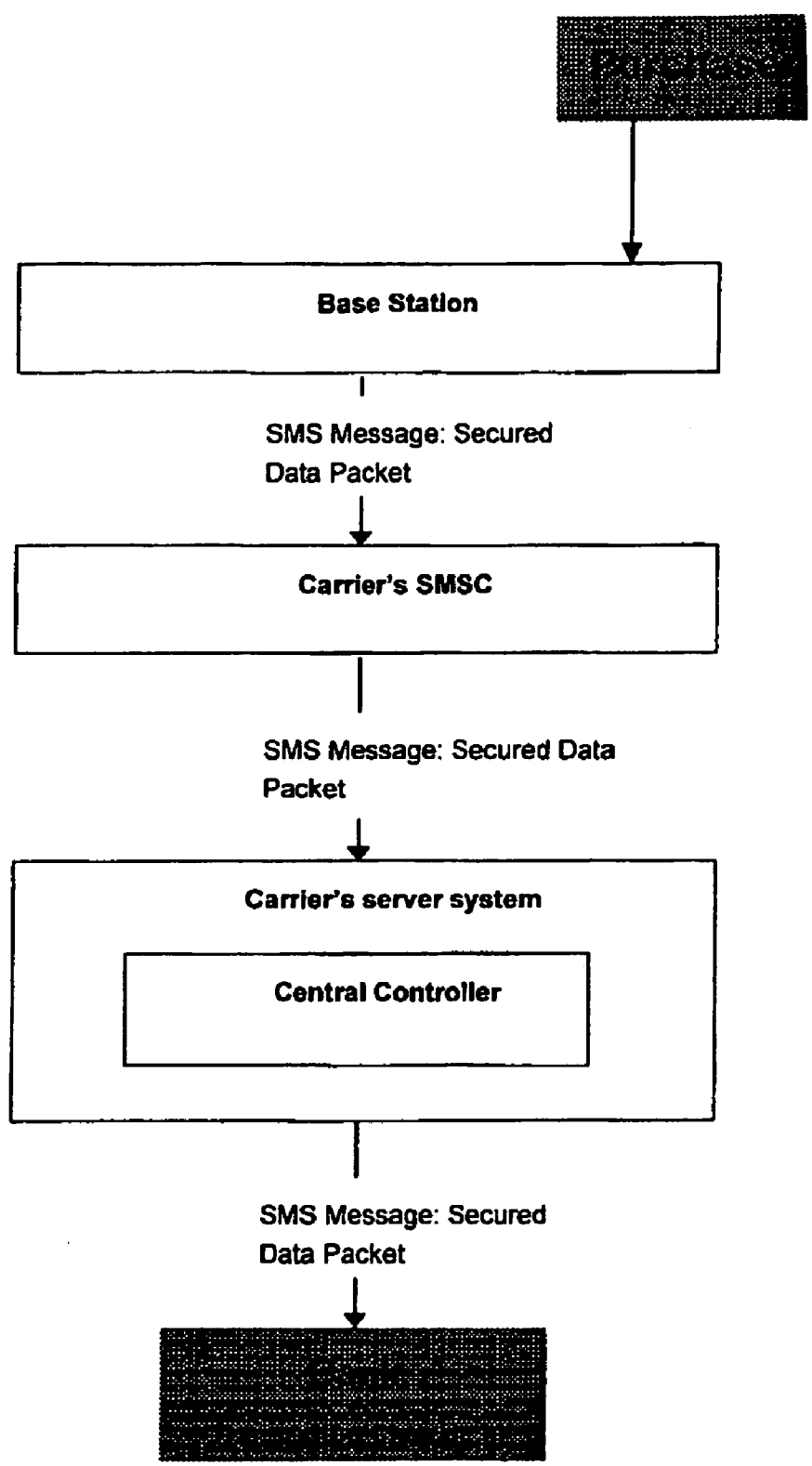
FIG. 6 is a simplified flow diagram illustrating further steps in the method of the present invention which occur at the system server.

FIG. 6 is a flow diagram illustrating the fourth main step in the method of the present invention which occurs at a telecommunication carrier (or system server).

In this embodiment, the secured data packet is received by the Carrier's base station, which passes it on to its SMSC and then its Server System. The secured data packet is used such that the Customer's identity is authenticated and a credit/debit payment is authorised, which results in the Customer paying the Bank and the Bank paying the Supplier.

As shown in FIG. 7 the system server typically consists of 2 primary software components (shown as "Gateway Receiver" and "Gateway Core") and one or more databases. FIG. 7 shows 2 databases—one being a transaction database ("Transation DB") and the other is a customer database ("M-Directory DB"). The main purpose of the Transaction DB is to maintain records in respect of transactions performed over the system. The databases work in conjunction with the Gateway Core in order to carry out transaction logging and to capture itemised bill information.

The system server is typically built on top of a Message Oriented Middleware ("MOM"), and Java Messaging Service ("JMS") is generally specified as the API for accessing the MOM for the subject messaging system.

The invention will now be illustrated by reference to the following example:

EXAMPLE

FIGS. 9 to 14 are logic flow diagrams showing the flow of messages within the system of this invention. The steps shown in a hexagonal border are performed within the Gateway Receiver and steps contained in rectangular borders are performed in the Gateway Core. The system server receives a request from the supplier device ("M Payment Request Initialisation Tool") to initiate a transaction. The message then undergoes certain checks within the carrier server. A transaction identifier ("MTransID") is added to the message and the message can then be sent.

Figure 9:
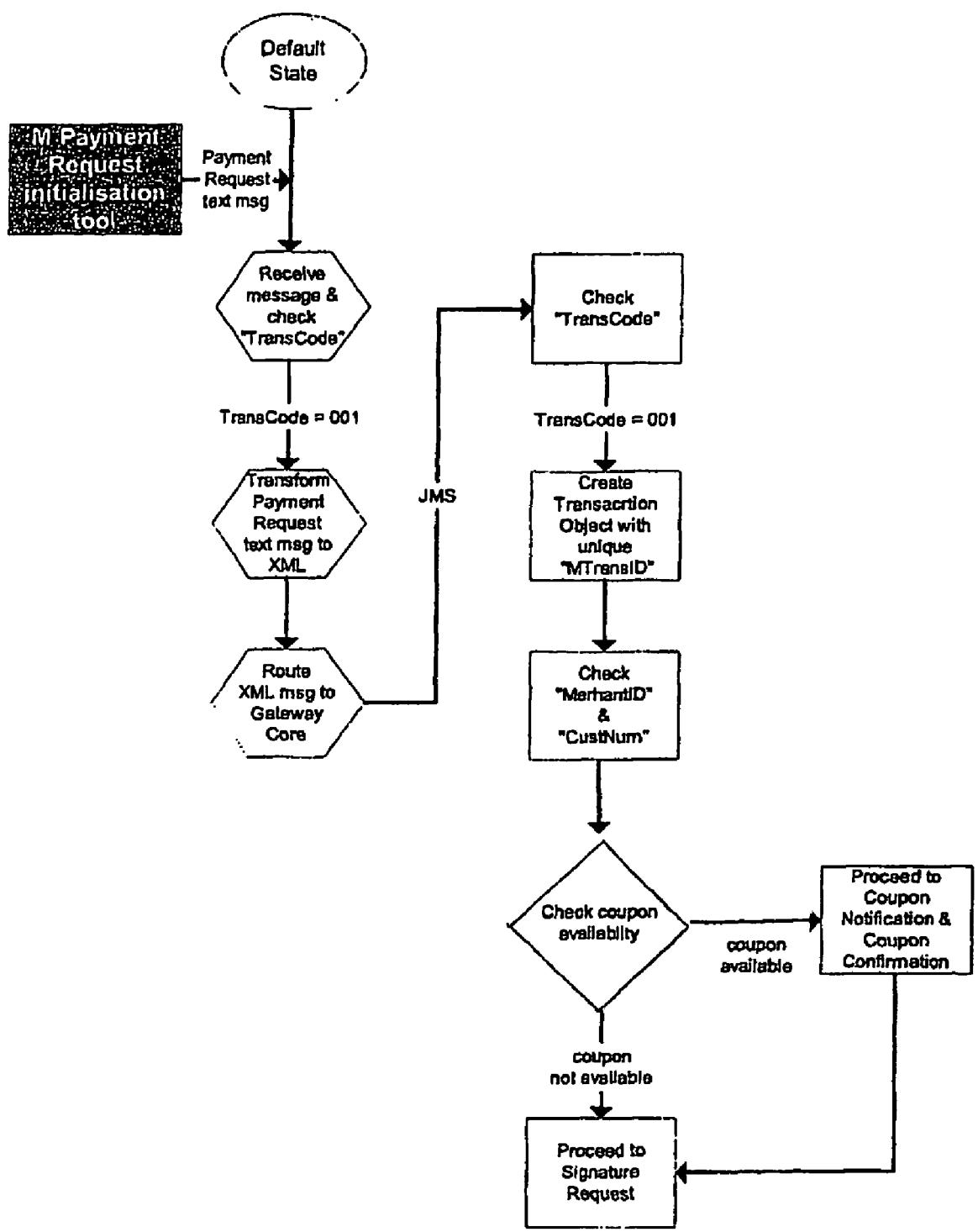
FIG. 9 is a logic flow diagram showing transaction initiation steps of an embodiment of the method of this invention.

Alternatively (as shown in FIG. 9), before the message is sent, the system server can check on the availability of any benefits (eg coupons, product/service offerings and the like) being offered by the supplier. In order to do this, the system server checks its database records and if a particular benefit is found, then the processing steps are implemented.

Figure 10:
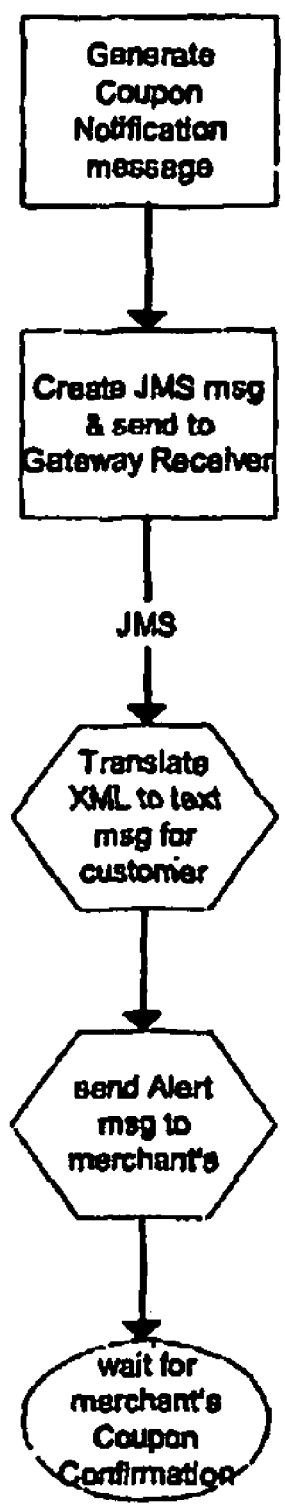
FIG. 10 is a large flow diagram showing benefit notification steps of a preferred embodiment of the method of this invention.
Figure 11:
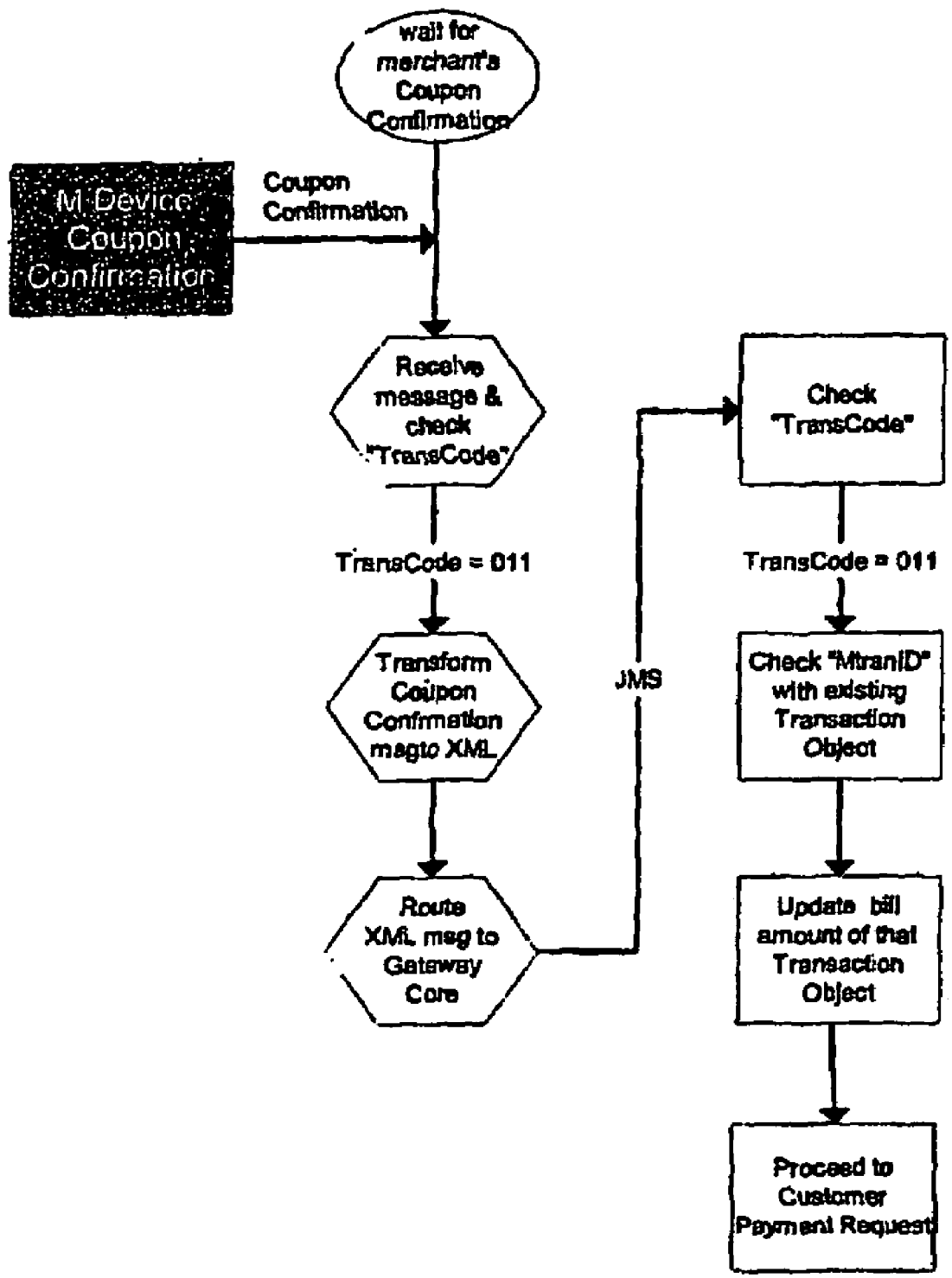
FIG. 11 is a large flow diagram showing benefit confirmation steps of a preferred embodiment of the method of this invention.

The benefit processing steps are shown in FIGS. 10 and 11. If a benefit is located, a message is sent from the system server to the supplier device seeking confirmation that the benefit is available. A supplier reply is then sent from the supplier device back to the system server confirming whether or not the benefit is available. If it is, the system server will include an indication to this effect in the transaction request message sent to the customer. The system server may need to alter the monetary amount of the transaction if, for example, a discount is provided by virtue of the benefit. The benefit need not always be a discount. It may include other product or service offerings provided by the supplier.

Figure 12:
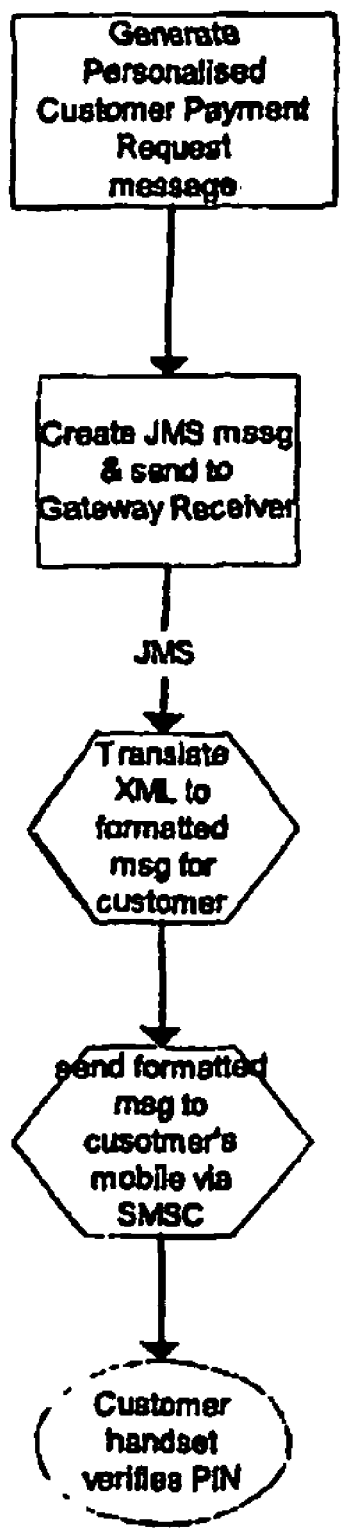
FIG. 12 is a logic flow diagram of transaction request steps of an embodiment of the method of this invention.
Figure 13:
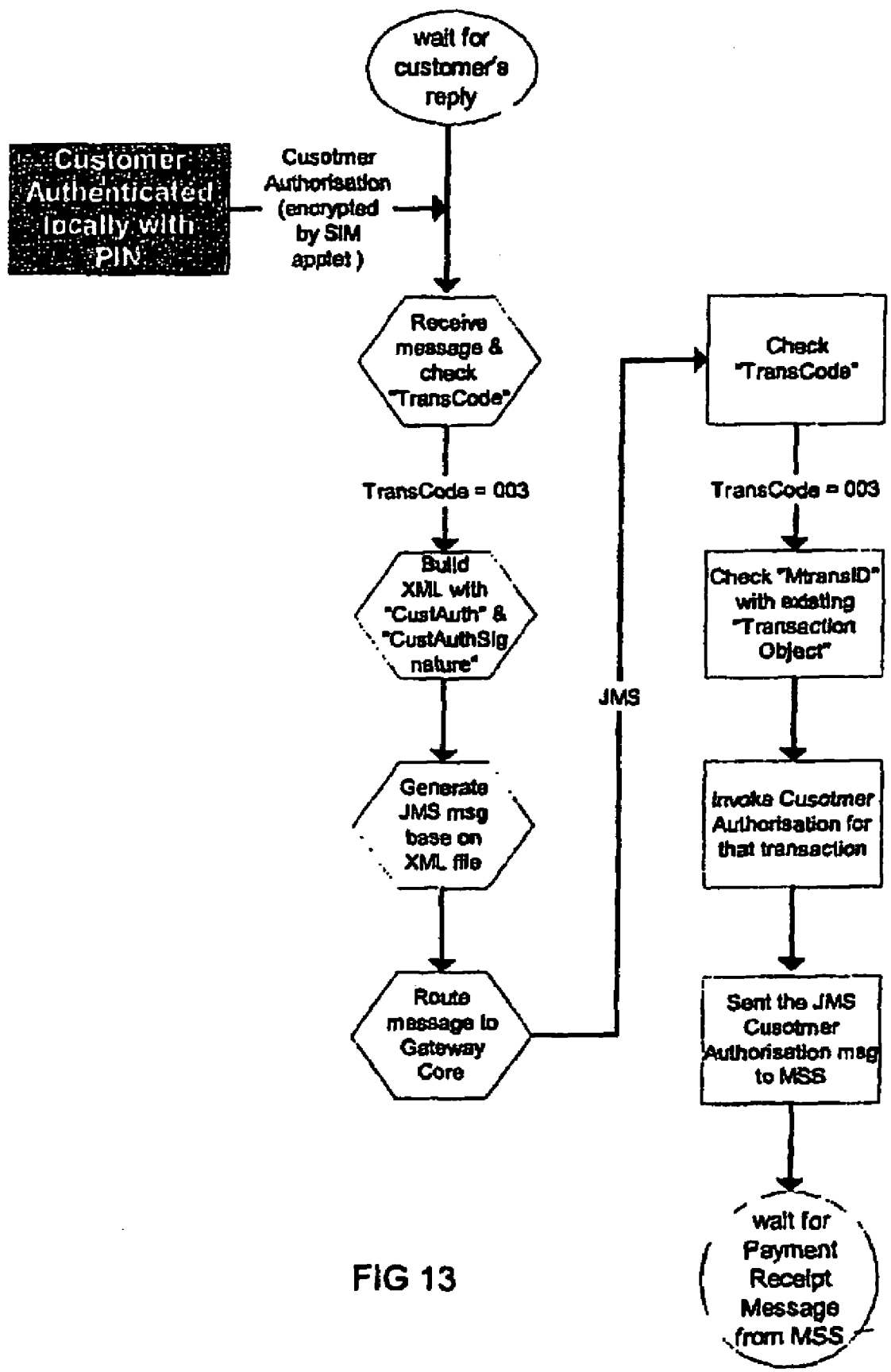
FIG. 13 is a logic flow diagram of 3 steps associated with transmitting the verification message to the transaction processing system in an embodiment of the method of this invention.

Following the benefit processing steps, or if no benefit was previously located by the system server, the system server then sends a transaction request message to the customer's mobile phone requesting verification of the transaction (see FIG. 12). The customer then, in conjunction with the mobile phone verifies and authorises the transaction by virtue of the message processing program module contained in the mobile phone (typically in the SIM card). If the customer wishes to proceed with the transaction, a secure verification message (which is typically encrypted and digitally signed) is sent back to the system server. The verification message then undergoes certain minor steps (including checking of the transaction identifier and the message code) and the verification message is then sent to the transaction processing server ("MSS") (see FIG. 13).

Figure 14:
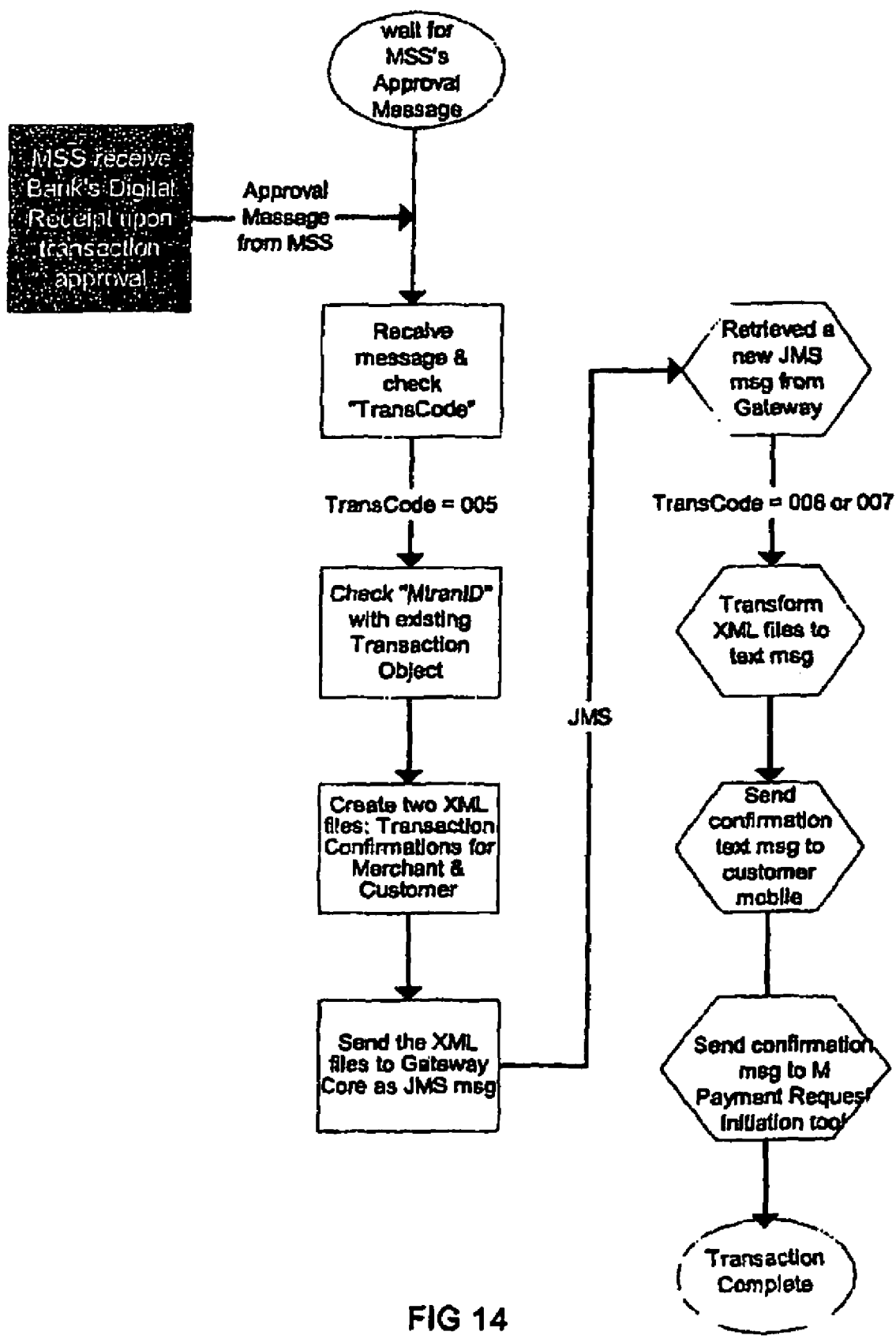
FIG. 14 is a logic flow diagram of transaction approval steps of an embodiment of the method of this invention.
Figure 15:
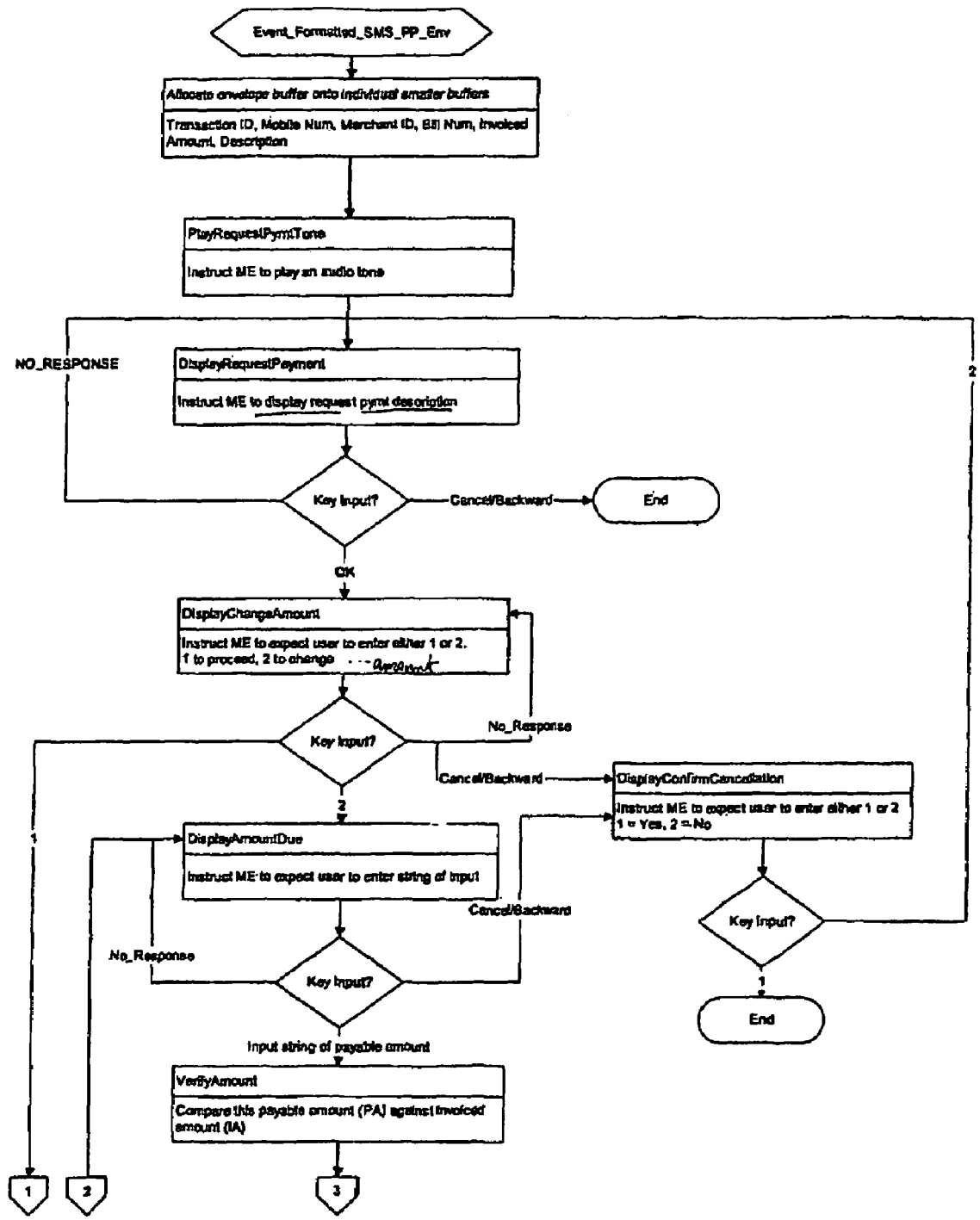
FIGS. 15*a* and 15*b* constitute a menu flow diagram of transaction request steps associated with an embodiment of the method of this invention.
Figure 15:
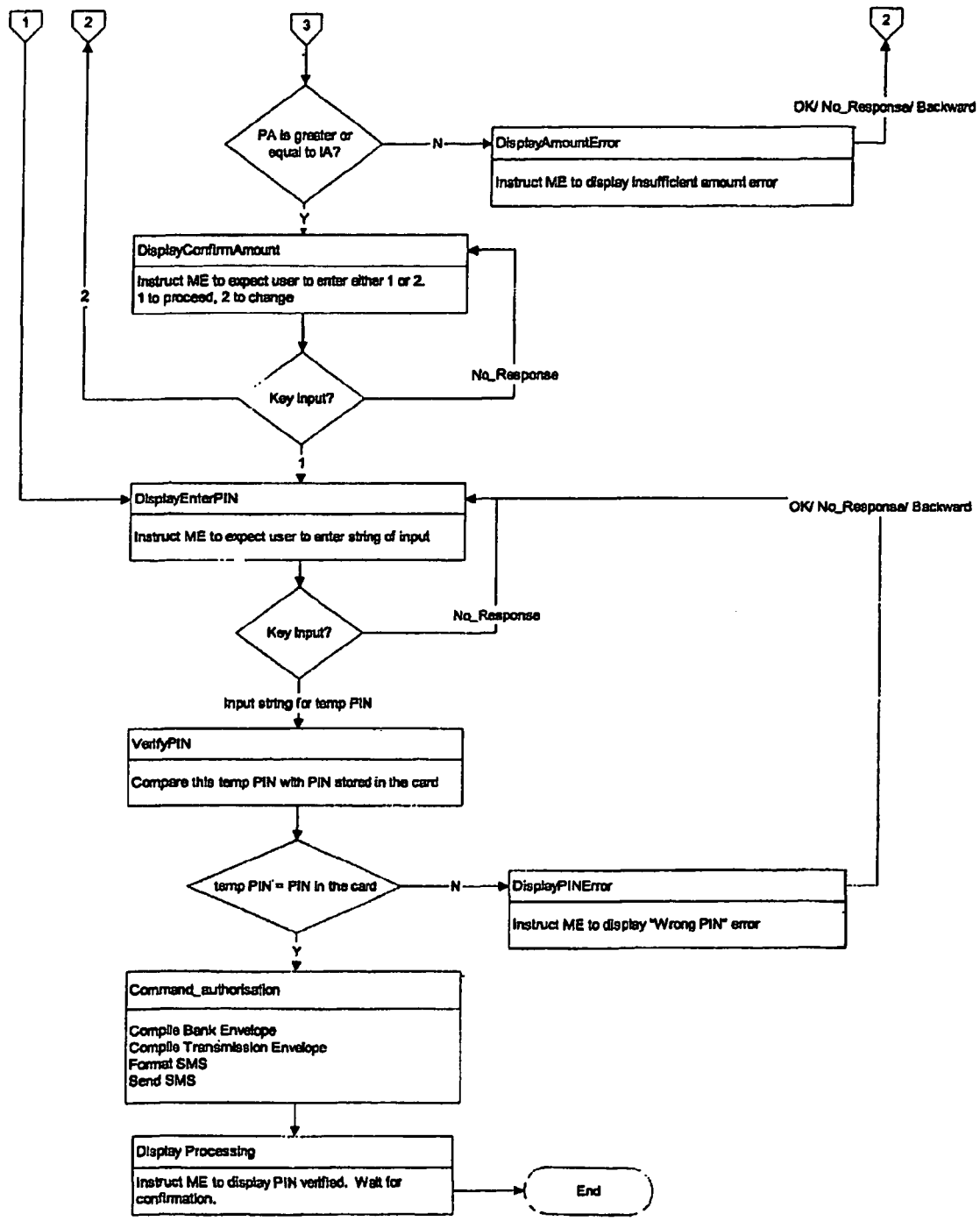

As shown in FIG. 14, if the transaction is approved by the relevant financial institution, the transaction processing server is notified of this and sends a corresponding message to the system server. The system server then passes on such a confirmation message to the supplier device and to the customer's mobile phone. The transaction is then completed.

The data flow of the referred embodiment of this invention (exemplified above) can be summarised as follows:

1) Merchant initiates and sends a formatted 'Merchant Payment Request Message' to M Gateway.

The Merchant Payment Request Message (TransCode=001) data string:

TransCode;DeviceID;MerchantID;Merchant Name;CustNum;BillNum;AmountRequest;Items->M Gateway 2) M Gateway checks coupon database for coupon availability for particular purchase.

If no coupon is available, proceed to step 4.

If coupon is available, send 'Coupon Notification Message' to merchant's M Device.

The Coupon Notification Message (TransCode=010) data string:

TransCode;MtransID;CustNum;Billnum;CouponNum; Coupon;CouponExpiry;

3) 'Coupon Confirmation Message' returns from merchant's M Device with the new amount.

The Coupon Confirmation Message (TransCode=011) data string:

TransCode;MtransID;MerchantID;BillNum;CouponNum; AmountRequest

4) M Gateway transforms the 'Merchant Payment Request Message' to a 'Customer Payment Request Message' and routes it to customer's mobile handset via SMS.

The Customer Payment Request Message (TransCode=002) data string:

TransCode;MtransID;MerchantID; BillNum; AmountRequest;[<MerchantName> requests payment of <Amount>. u accept?->Customer Mob 5) Customer replies the 'Customer Payment Request Message' by keying in the PIN to authorise the transaction. A digitally signed Customer Authorisation Message will be sent to M Gateway.

The Customer Authorisation Message (TransCode=003) data string:

TransCode;MtransID;[MerchantID;CustAccountNo; BillNum;amount];SIGNATURE -> M Gateway 6) When M Gateway receives 'Customer Authorisation Message', it identifies the TransCode and the MtransID and transfers the secure data packet to the MSS as a 'Transaction Order'.

MSS decrypts the digitally signed customer authorisation data packet and generates a 'Bank Approval Request'. This Bank Approval Request is then sent to the bank's payment system.

The Transaction Order (TransCode=004) data string:

TransCode;MtransID;CustNum;[MerchantID;CustAccountNo;BillNum;amount];SIGNATURE -> MSS 7) MSS sends a 'Payment Receipt Message' to M Gateway when the bank's payment system has acknowledged the transaction order, verified the transaction detail and approved the transaction.

The Payment Receipt Message (TransCode=005) data string:

TransCode;MtransID;CustNum;[ApprovalCode;CTransRefNum];MerchantID;[ApprovalCode;MTransRefNum; CTrans]Num]-> M Gateway 8) M Gateway transforms the 'Payment Receipt Message' and sends it to the customer's mobile handset via SMS.

The Payment Receipt Message (TransCode=006) data string (for customer):

TransCode;MtransID;[ApprovalCode;CTransRefNum]->Customer mob

9) M Gateway transforms the 'Payment Receipt Message' and sends it to the merchant via SMS or IP connections.

The Payment Receipt Message (TransCode=007) data string (for merchant):

TransCode;MtansID;[ApprovalCode;MTransRefNum; CTransRefNum]-> M-Device

Itemised Bill Information Data Flow

When itemised bill information is made available from M Device's bill capture, M Device sends the sales items text string to M Gateway.

The Itemised Bill Information (TransCode=009) data string:

TransCode;MerchantID;BillNum;Items

SMS Coupon Data Flow

When a Coupon is make available by Project M's targeted life-style suggestion programme, M Gateway generates a SMS Coupon and sends it to the customer's mobile handset via SMS.

The SMS Coupon message (TransCode=012) data string (for merchant):

TransCode;MobileNum;CustNum;CouponNum;[<MerchantName> offers you <Coupon> until <CouponExpiry YY-MMM-DD, HH:MM>

It will be appreciated from the foregoing discussion that the present invention has a number of advantages over prior art payment systems and methods. These include:

1. Real-time direct customer approval—the invention changes the fundamental authentication mechanism by adopting wireless communication network to facilitate real time personal approval and authorisation capability. The invention is designed to improve the mechanism through:

The use of a mobile device, such as a mobile phone, in the authentication process, which is carried out by the phone user, provides a comprehensive authentication process. This minimises the possibility of fraud, such as magnetic strip reproduction and card cloning which has been a major problem in respect of credit cards.

The customer carries out the authorisation by entering a unique PIN into his/her own handset; the suppliers are no longer responsible for POS authentication and signature verification. The responsibility rests on the customer as he/she keys-in the PIN.

Customer identification is now represented by a distinctive SIM card number/phone number, and is verified real-time by the Trusted Agent SMS network.

This reduces the authentication risk and limits the liability of all parties

2. Secure environment—The invention enhances the security by adopting SIM card (or similar software contained in the mobile phone) as the technology platform. The quality of the SIM card application ensures strong data confidentiality when secure messages are transported through the GSM network. Thereby increasing the security level of payment system. For example:

SIM card can store and compute digital signatures, which ensure authentication, non-repudiation, confidentiality and reliability of transactions.

SIM card is preferably anti-clone, this minimises the chance of fake cards

SIM Card and GSM network hosting the transaction information passage also improve traceability and confidentiality.

3. Trust Key—the invention enhances overall security by requesting the Customer to use a SIM card that has a Trust Key as well as a client system embedded. The Trust Key is expected to provide a security infrastructure for Bank(s) to implement Private-Public Key encryption and decryption technology. Thus the financial security of the Customer is independent from the Carrier(s).

4. Greater efficiency—the system of the invention has been designed to be relatively simple to implement and use. The system server is not required to carry out detailed verification/authentication steps (which are now mainly carried out within the mobile device (eg mobile phone). Consequently, the server is less expensive to manufacture and less likely to default than certain prior art servers. The simplicity of the system leads to greater reliability and speed of transactions.

Using the invention described herein, consumers, suppliers and banks (or other financial institutions) will enjoy a higher level of security to protect confidential information, reduce the costs to suppliers and banks by minimising the risk of charge backs and lower potential consumer or supplier frauds.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A transaction processing system for processing a transaction between a supplier and a customer, said system comprising:
   (a) a supplier device for initiating a transaction between the supplier and the customer, said supplier device including:
      (i) supplier device data storage means for storing supplier identifying indicia;
      (ii) supplier device data receiving means for receiving transaction data and customer-supplied customer identifying indicia, said transaction data including the monetary amount of the transaction;
      (iii) supplier device message generation means for generating a transaction message containing the supplier identifying indicia, the transaction data and the customer identifying indicia; and
      (iv) supplier device telecommunication means for sending the transaction message to a system server and for receiving messages from the system server;
   (b) the system server which includes:
      (i) server data storage means for storing supplier information and customer information;
      (ii) server telecommunication means for sending and receiving messages to and from the supplier device and a mobile communication device of the customer;
      (iii) server verification means:
         for verifying that the supplier identifying indicia and the customer identifying indicia in the transaction message match corresponding indicia within the supplier information and the customer information, respectively; and
         for issuing either a transaction proceed order or a transaction terminate order based on a result of said server verification;
      (iv) server message generation means for generating either:
         a transaction denied message following receipt of a transaction terminate order; or
         a transaction request message following receipt of a transaction proceed order, said message containing, the supplier identifying indicia, the transaction data, the customer identifying indicia, and a unique transaction identifier which is different for each transaction;
         and for transmitting the transaction denied message or the transaction request message to the server telecommunication means for the sending of said message to the mobile communication device;
   (c) the mobile communication device of the customer, comprising
      (i) mobile device telecommunication means for receiving messages from and sending messages to the system server;
      (ii) a message processing program module comprising:
         mobile device data storage means containing a customer security criterion; and
         transaction authorisation means adapted to extract the transaction data and the supplier identifying indicia contained in the transaction request message, received by the mobile communication device, and to generate and display, on a visual display screen of the mobile communication device, a message containing the transaction data, the supplier identifying indicia and a request for the customer either to:
         authorise the transaction, by making a first pre-determined entry in a keypad of the mobile device, said predetermined entry including a secret identification parameter of the customer, or
         decline the transaction, by making a second pre-determined entry in the keypad;
      (iii) verification message generation means adapted to:
         receive an authorisation order generated by the first pre-determined entry into the keypad;
         following receipt of said authorisation order, verify that the identification parameter matches the customer security criterion in the mobile device data storage means and, if they do match, generate a verification message, said verification message containing contents of the transaction request message; and
         encrypt the verification message to generate a secure verification message.
      (iv) decline transaction message generation means adapted to:
         receive a decline order generated by the second pre-determined entry into the keypad; and
         generate a decline transaction message, following receipt of said decline order; and
      (v) message transfer means for transferring the secure verification message, or the decline transaction message, to the mobile device telecommunication means for sending to the system server;
   (d) a transaction processing server, in secure communication with the system server, comprising:
      (i) means for receiving the secure verification message;
      (ii) means for decrypting the secure verification message; and
      (iii) processing means for: identifying a customer account associated with the customer identifying indicia; identifying a supplier account associated with the supplier identifying indicia; arranging for said customer account to be debited by the monetary amount of the transaction; and arranging for said supplier account to be credited by said monetary amount.

2. A transaction processing system according to claim 1 wherein the customer identifying indicia is a mobile telephone number of said mobile communication device.

3. A transaction processing system according to claim 1 wherein the transaction data further includes one or more of the following; time of the transaction; nature of the goods and/or services being purchased; monetary amount of particular goods and/or services of the transaction; and any discount or surcharge applied by the supplier.

4. A transaction processing system according to claim 1 wherein the unique transaction identifier of the transaction request message is assigned by the system server.

5. A transaction processing system according to claim 1 wherein the customer security criterion is a personal identification number (PIN) of the customer.

6. A transaction processing system according to claim 1 wherein the transaction message, the transaction request message and the verification message are mobile data messages.

7. A transaction processing system according to claim 6 wherein the mobile data messages are selected from SMS messages, GPRS messages and UTMS messages.

8. A transaction processing system according to claim 7 wherein the secure verification message, sent from the mobile communication device to the system server, comprises a binary data stream.

9. A transaction processing system according to claim 8 wherein the transaction message and the transaction request message also comprise binary data streams.

10. A transaction processing system according to claim 1 wherein:
(a) the system server includes digital signature recognition means; an
(b) the verification message generation means is further adapted to create and attach to the secure verification message a digital signature adapted to be recognised by said recognition means.

11. A transaction processing system according to claim 1 wherein the transaction authorising means of the program module is further adapted to include, in the request within the message generated by said authorising means, a further option to enable the customer to indicate that the monetary amount of the transaction is to be varied.

12. A transaction processing system according to claim 11 wherein said option is exercisable by a third predetermined entry being made in the keypad.

13. A transaction Processing system according to claim 12 wherein the transaction authorising means is adapted, upon receipt of the third predetermined entry being made, to:
(a) generate a query message querying the amended monetary amount to which the customer wants the monetary amount amended;
(b) receive said amended monetary amount input by the customer; and
(c) amend the monetary amount of the transaction data to the amended monetary amount.

14. A transaction processing system according to claim 13 wherein, if the monetary amount is so amended, in all subsequent messages which contain the monetary amount, the amended monetary amount will be substituted for the monetary amount.

15. A transaction processing system according to claim 1 wherein the message processing program module is contained in a Subscriber Identity Module (SIM) card.

16. A transaction processing system according to any claim 1 wherein:
(a) the transaction message sent to the system server includes a predetermined transaction message code;
(b) the transaction request message sent to the mobile communication device contains a predetermined request message code;
(c) the verification message sent to the system server contains a predetermined verification message code;
wherein said codes are recognisable by the receiving system server or mobile device and said receiving system server or mobile device are adapted to discontinue the transaction if the relevant message does not contain its predetermined code.

17. A transaction processing system according to claim 1 wherein the server data storage means of the system server further includes benefits information concerning the availability of benefits offered by system-subscribed suppliers, and the system server further includes:
(a) checking means adapted to determine whether the server data storage means contains any benefits information concerning any benefits which are or may be, available in respect of, or in association with, the transaction; and
means for generating a benefit notification message if any relevant benefit is located and for transmitting this notification message to the server telecommunication means for sending to the supplier device, said notification message containing details of the located benefit and a request for the supplier to verify or deny availability of the benefit.

18. A transaction processing system according to claim 17 wherein the supplier device further includes benefit processing means adapted to:
(a) receive and display the benefit notification message;
(b) receive a verification input or a denial input from the supplier; and
(c) upon receipt of a verification input, revise the monetary amount to a revised monetary amount to accommodate any discount associated. with said benefit and to send to the system server a benefit confirmation message containing the revised monetary amount; or
(d) upon receipt of a denial input, send a benefit denial message to the system server.

19. A transaction processing system according to claim 18 wherein, if the monetary amount is so revised, in all subsequent messages when contain the monetary amount, the revised monetary amount will be substituted for the monetary amount.

20. A transaction processing system according to claim 1 wherein the server data storage means further includes a transaction database adapted to capture desired details of each transaction.

21. A transaction processing system according to claim 20 wherein the desired transaction details include one or more of the following:
(a) the transaction data;
(b) desired additional transaction data including some or all of, date of transaction, amount of any discount provided; and the goods or services covered by the transaction; and
(c) customer identifying indicia, and supplier identifying indicia.

22. A transaction processing system according to claim 21 wherein the transaction processing server is in secure communication with a financial institution server, said financial institution server being adapted to transfer funds, corresponding to the monetary amount, to the supplier account and to record a corresponding debit in the customer account.

23. A transaction processing system according to claim 22, wherein the transaction processing server communicates with the financial institution server via a payment gateway.

24. A transaction processing system according to claim 1 wherein the transaction processing server further includes account record means for keeping a record of the supplier account, the customer account and all debits and credits associated with these accounts.

25. A transaction processing system according to claim 1 wherein:
   (a) the transaction processing server is adapted to send, upon completion of the transaction, a transaction complete message to the system server; and
   (b) the system server is adapted to send said transaction complete message to either or both of the supplier device and the mobile communication device.

26. A message processing program module according to claim 25 wherein said program module is contained in a SIM card.

27. A method of processing a transaction between a supplier and a customer, using a transaction processing system, said method comprising:
   (a) within the supplier device:
      (i) receiving transaction data and customer-supplied customer identifying indicia;
      (ii) generating a transaction message containing the supplier identifying indicia (obtained from data storage means within the supplier device), the transaction data and the customer identifying indicia;
      (iii) transmitting the transaction message to the supplier device telecommunications means; and
      (iv) sending the transaction message to the system server;
   (b) within the system server:
      (i) receiving the transaction message;
      (ii) verifying that the supplier identifying indicia and the customer identifying indicia in the transaction message match corresponding indicia within the supplier information and customer information (stored in data storage means within the server);
      (iii) issuing either a transaction proceed order or a transaction terminate order based on result of said verification;
      (iv) transmitting the transaction proceed order or the transaction terminate order to the server message generation means;
      (v) generating, within the server message generation means, either:
         a transaction denied message following receipt of a transaction terminate order; or
         a transaction request message following receipt of a transaction proceed order, said message containing, the supplier identifying indicia, the transaction data, the customer identifying indicia, and a unique transaction identifier which is different for each transaction;
      (vi) transmitting the transaction denied message or the transaction request message to the server telecommunications means;
      (vii) sending the transaction denied message to the supplier device or sending the transaction request message to mobile device telecommunication means of the customer;
   (c) within the mobile communication device:
      (i) receiving, within the telecommunication means of the mobile device, the transaction request message;
      (ii) transmitting the transaction request message to receiving means within a message processing program module;
      (iii) said module:
         extracting transaction data and supplier data from the transaction request message;
         generating and displaying, on a visual display screen of the mobile communication device, a message containing the transaction data, the supplier identifying indicia and a request for the customer either to:
         authorise the transaction, by making a first predetermined entry in a keypad of the mobile device, said predetermined entry including a secret identification parameter of the customer, or
         decline the transaction, by making a second predetermined entry in the keypad;
         receiving an authorisation order generated by the first pre-determined entry into the keypad;
         following receipt of said authorisation order, verifying that the identification parameter matches the customer security criterion in the mobile device data storage means and, if they do match, generating a verification message, said verification message containing the contents of the transaction request message;
         encrypting the verification message to generate a secure verification message;
         transferring the secure verification message to the mobile device telecommunication means;
      (iv) sending the secure verification message to the system server.

28. A method according to claim 27 wherein the unique transaction identifier of the transaction request message is assigned by the system server.

29. A method according to claim 27 including the further step of forwarding the secure verification message from the system server onto the transaction processing server.

30. A method according to claim 29 further including the transaction processing server decrypting the secure message verification.

31. A method according to claim 30 wherein, following decryption, the transaction processing server:
   (a) identifies a customer account associated with the customer identifying indicia and a supplier account associated with the supplier identifying indicia; and
   (b) arranges for said customer account to be debited by the monetary amount of the transaction and for said supplier account to be credited by the monetary amount.

32. A method according to claim 27 wherein the transaction message, the transaction request message and the verification message are mobile data messages.

33. A method according to claim 32 wherein the mobile data messages are selected from SMS messages, GPRS messages and UTMS messages.

* * * * *

UNITED STATES PATENT AND TRADEMARK OFFICE
CERTIFICATE OF CORRECTION

PATENT NO.       : 7,379,920 B2
APPLICATION NO.  : 10/497739
DATED            : May 27, 2008
INVENTOR(S)      : Gary Leung et al.

It is certified that error appears in the above-identified patent and that said Letters Patent is hereby corrected as shown below:

At Column 22, line 46, "message." should be -- message; --.

At Column 23, line 50, "Processing" should be -- processing --.

At Column 24, line 22, "are" should be -- are, --.

At Column 24, line 40, "associated." should be -- associated --.

Signed and Sealed this

Seventh Day of October, 2008

JON W. DUDAS
*Director of the United States Patent and Trademark Office*